(12) United States Patent
Roatis et al.

(10) Patent No.: US 7,373,352 B2
(45) Date of Patent: May 13, 2008

(54) ELECTRONIC KEY-CONTROL AND MANAGEMENT SYSTEM FOR VENDING MACHINES

(75) Inventors: Calin V. Roatis, Des Plaines, IL (US); William D. Denison, Lake Zurich, IL (US); Gary L. Myers, Monee, IL (US)

(73) Assignee: TriTeq Lock and Security, LLC, Elk Grove, IL (US)

( * ) Notice: Subject to any disclaimer, the term of this patent is extended or adjusted under 35 U.S.C. 154(b) by 421 days.

(21) Appl. No.: 11/010,661

(22) Filed: Dec. 13, 2004

(65) Prior Publication Data

US 2005/0165806 A1 Jul. 28, 2005

Related U.S. Application Data

(60) Provisional application No. 60/528,831, filed on Dec. 11, 2003.

(51) Int. Cl.
*G06F 7/00* (2006.01)
(52) U.S. Cl. ........... 707/100; 340/5.23; 340/5.61
(58) Field of Classification Search ........... 707/100
See application file for complete search history.

(56) References Cited

U.S. PATENT DOCUMENTS

| | | | |
|---|---|---|---|
| 4,031,434 A | 6/1977 | Perron et al. | |
| 4,167,104 A | 9/1979 | Bond | |
| 4,268,076 A | 5/1981 | Itoi | |
| 4,369,442 A | 1/1983 | Werth et al. | |
| 4,509,093 A | 4/1985 | Stellberger | |
| 4,594,637 A | 6/1986 | Falk | |
| 4,779,090 A | 10/1988 | Micznik et al. | |
| 4,926,996 A | 5/1990 | Eglise et al. | |
| 5,339,250 A | 8/1994 | Durbin | |
| 5,349,345 A | 9/1994 | Vanderschel | |
| 5,392,025 A | 2/1995 | Figh et al. | |
| 5,575,515 A | 11/1996 | Iwamoto et al. | |
| 5,636,881 A | 6/1997 | Stillwagon | |
| 5,745,044 A | 4/1998 | Hyatt, Jr. et al. | |
| 5,774,053 A | 6/1998 | Porter | |
| 5,813,257 A | 9/1998 | Claghorn et al. | |
| 5,841,866 A | 11/1998 | Bruwer et al. | |
| 5,886,644 A | 3/1999 | Keskin et al. | |
| 6,005,487 A * | 12/1999 | Hyatt et al. ........... | 340/5.65 |
| 6,038,491 A | 3/2000 | McGarry et al. | |
| 6,068,305 A | 5/2000 | Myers et al. | |
| 6,318,137 B1 | 11/2001 | Chaum | |
| 6,345,522 B1 | 2/2002 | Stillwagon et al. | |
| 6,401,059 B1 | 6/2002 | Shen et al. | |
| 6,483,424 B1 | 11/2002 | Bianco | |
| 6,496,101 B1 | 12/2002 | Stillwagon | |
| 6,525,644 B1 | 2/2003 | Stillwagon | |
| 6,575,504 B2 | 6/2003 | Roatis et al. | |
| 6,581,986 B2 | 6/2003 | Roatis et al. | |
| 6,684,671 B2 | 2/2004 | Beylotte et al. | |

(Continued)

*Primary Examiner*—Don Wong
*Assistant Examiner*—Binh V Ho
(74) *Attorney, Agent, or Firm*—Leydig, Voit & Mayer, Ltd.

(57) ABSTRACT

An electronic key control and management system for vending machines and like enclosures uses a computer and database to limit operation and parameters of electronic keys, customize the key limits, refresh keys, and collect, store and sort a host of data in various combinations, and according to preselected parameters to perform management of the keys and audit trail data.

30 Claims, 32 Drawing Sheets

U.S. PATENT DOCUMENTS

| | | |
|---|---|---|
| 6,867,685 B1 | 3/2005 | Stillwagon |
| 6,874,828 B2 | 4/2005 | Roatis et al. |
| 2002/0014950 A1 | 2/2002 | Ayala et al. |
| 2002/0024418 A1 | 2/2002 | Ayala et al. |
| 2002/0024420 A1 | 2/2002 | Ayala et al. |
| 2003/0030539 A1 | 2/2003 | McGarry et al. |
| 2003/0127866 A1 | 7/2003 | Martinez et al. |
| 2003/0128101 A1 | 7/2003 | Long |
| 2003/0234719 A1* | 12/2003 | Denison et al. ............ 340/5.23 |
| 2004/0201449 A1* | 10/2004 | Denison et al. ............ 340/5.23 |
| 2004/0207509 A1* | 10/2004 | Mlynarczyk et al. ...... 340/5.23 |

* cited by examiner

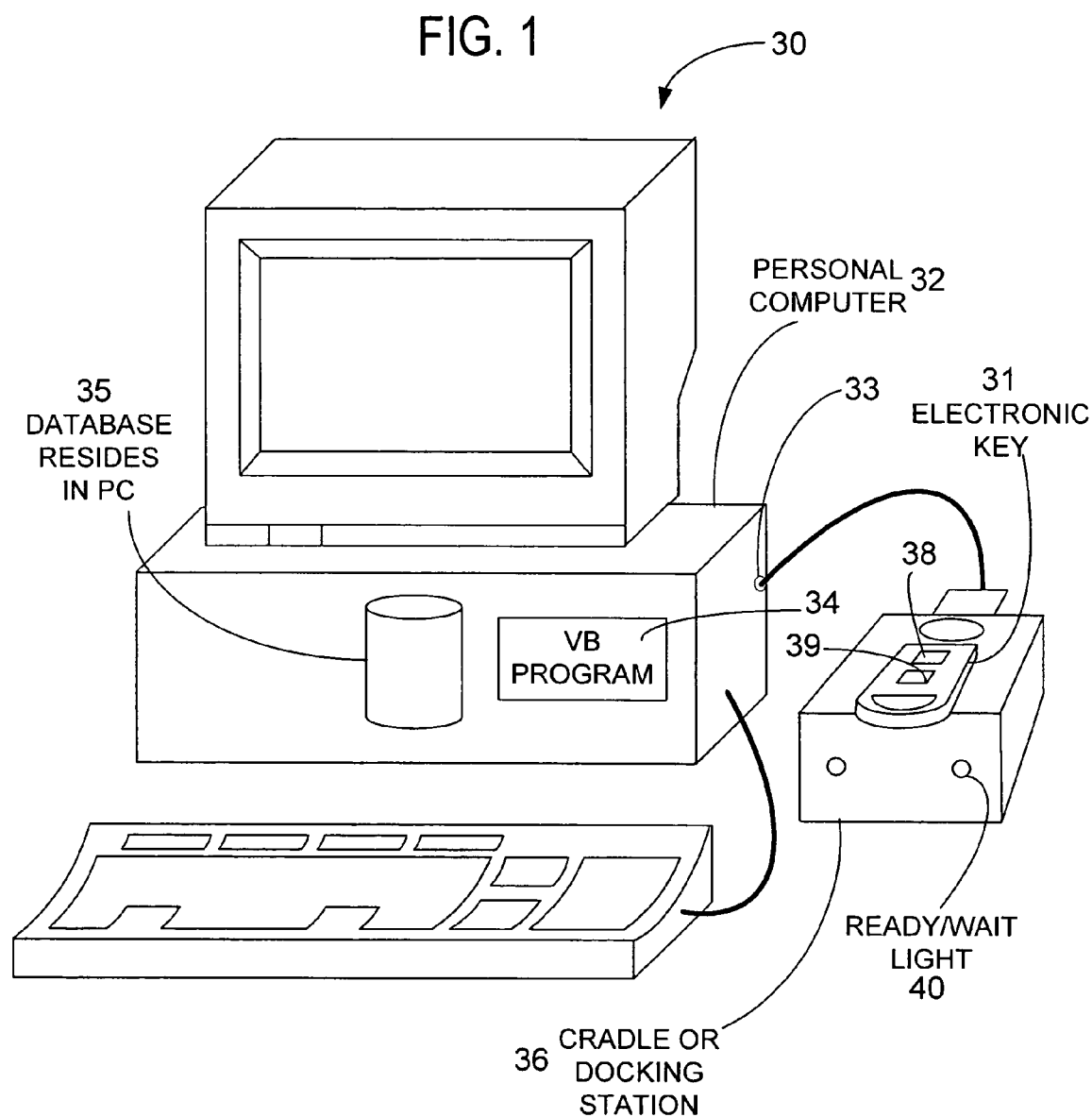

FIG. 2A

Software Registration Menu

Enter Cradle Label#

CD Software Label:

☐ Check this box If you are an independent

Bottler Name:

Business Unit (If applicable):

Market Unit (If applicable):

Contract Name: First and Last:

Address:

City, State

ZIP

Phone: xxx-xxx-xxxx

Fax: xxx-xxx-xxxx

Email:

Step 1. Click here After Entering Above

[Generate System ID#] [Back]

Step 2. If this station is connected to a printer, click on *Get Registration button to print out your registration, if not, write down all info Shown here and fax it to: 847-640-7008

Step 3 Click Here After Receiving Registration #

[Get Registration #]

[Go Next]

REGISTRATION Number appears

FIG. 3A

Enter Password

58

Password &&&&&

OK  Cancel

---

AutoTraq PC Interface V-6.5

File  Audit Trails  Edit Key Limits  Lock Utilities  Routes  Tools  Mode

Name  _____  Key Type  ____

Key ID  _____

Accesses Allowed  _____  Start Time  ____

Accesses Per Day  _____  Stop Time  ____

60

Refresh Days  _____

Expires on  _____

Days Valid  _____

☐ Cradle Ready for Key FOB

EXIT  Audit Trails  Clear Form

FIG. 6A — RECORDING LOCK ID# & VENDOR DATA MANUAL PROCEDURE

① READ LOCK ID WITH TOOL (POINT AT LOCK IR PORT) — 90, 92

OR

READ LABEL ON LOCK — 91, 90

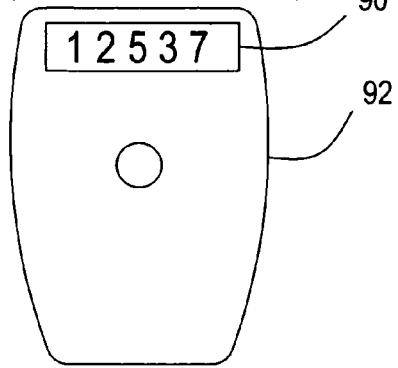
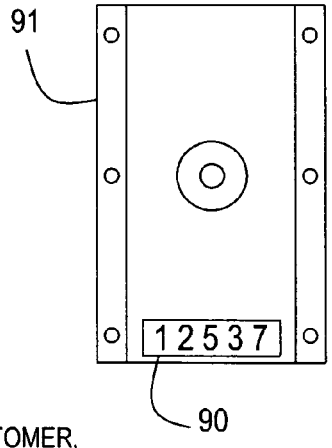

② RECORD VENDOR ASSET NUMBER, LOCATION, CUSTOMER, TIME AND DATE ON PAPER — 93

| LOCK ID | ASSET | LOCATION | TIME/ DATE |
|---|---|---|---|
| 12537 | 99999 | 35TH ST WALMART | 6/10/03 9:55 AM |
|  |  |  |  |
|  |  |  |  |
|  |  |  |  |

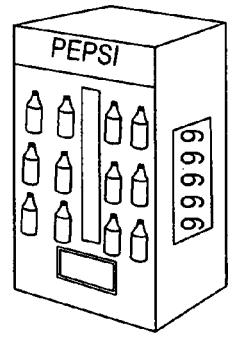

③ ENTER ASSET #, LOCATION/CUSTOMER DATA ON COMPUTER WHEN PROMPTED

ON 6-10-03 AT 9:55 AM, LOCK ID # 12357 WAS PUT INTO SERVICE. PLEASE ENTER THE FOLLOWING DATA:

ASSET NUMBER _____

LOCATION _____

CUSTOMER _____

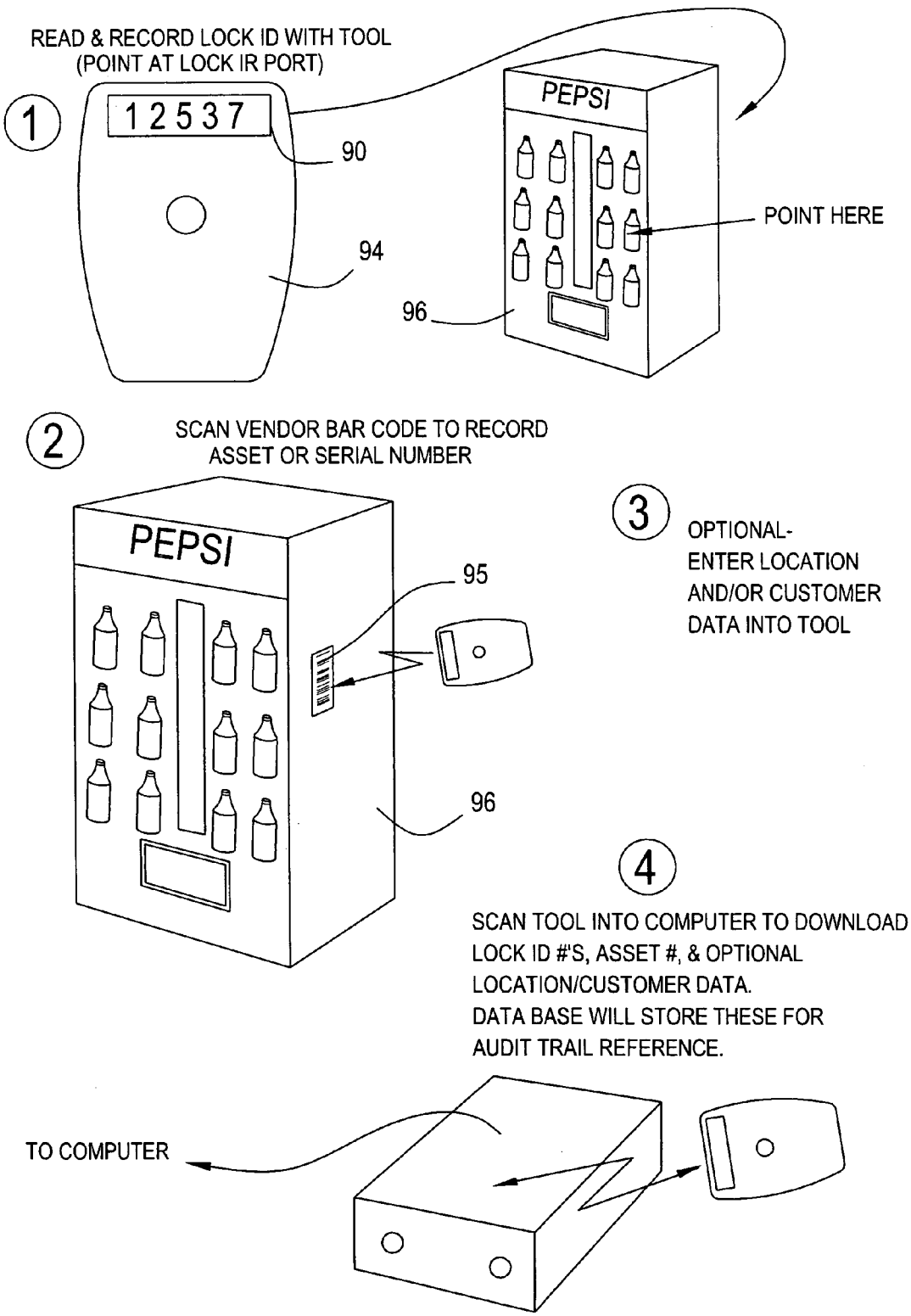

FIG. 9B

Edit Key Limits — 136

- Name: Art Tefissial
- Authorized By: Administrator (11/6/02 2:41:19 PM)
- Start: 8
- Stop: 5
- Total Accesses: 300
- Accesses Per Day: 60
- Refresh days: 7

Days valid:
- ☐ Sunday
- ☑ Monday
- ☑ Tuesday
- ☑ Wednesday
- ☑ Thursday
- ☑ Friday
- ☐ Saturday 137 — ☐ Disable FOB

FOB ID: ABA5011

Key Type: Full Serve - FS
Route: 0

[CANCEL] [View Present Limits] [View Previous Limits]

[Accept]

---

Administrator Logged in:

File  Audit Trails  Edit Key Limits  Customer/Lock Info  Routes  Tools  Mode  Registration  Help Only for KEY FOBS starting with: AB

- Name: Art Tefissial
- Key Type: Full Serve - FS
- Key ID: ABA5011
- Total Accesses: 300
- Start Time: 8:00 am
- Accesses Per Day: 60
- Stop Time: 5:00 pm
- Refresh days: 7

11/14/02 12:00:00 AM

_MTWTF_

☐ Cradle Ready for Key FOB

REFRESHED FOB ABA5011

Art Tefissial

[EXIT]  [Audit Trails]  [Clear Form]

FIG. 16
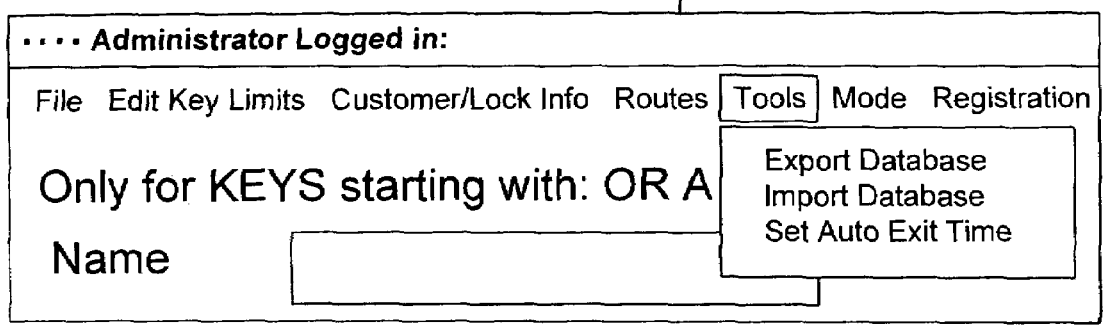
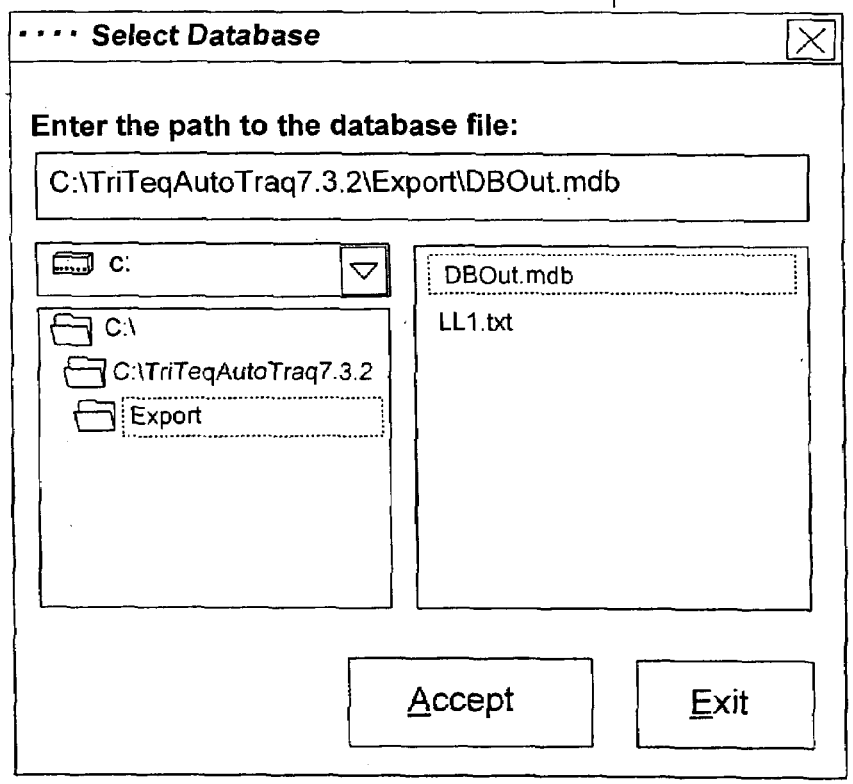

FIG. 18
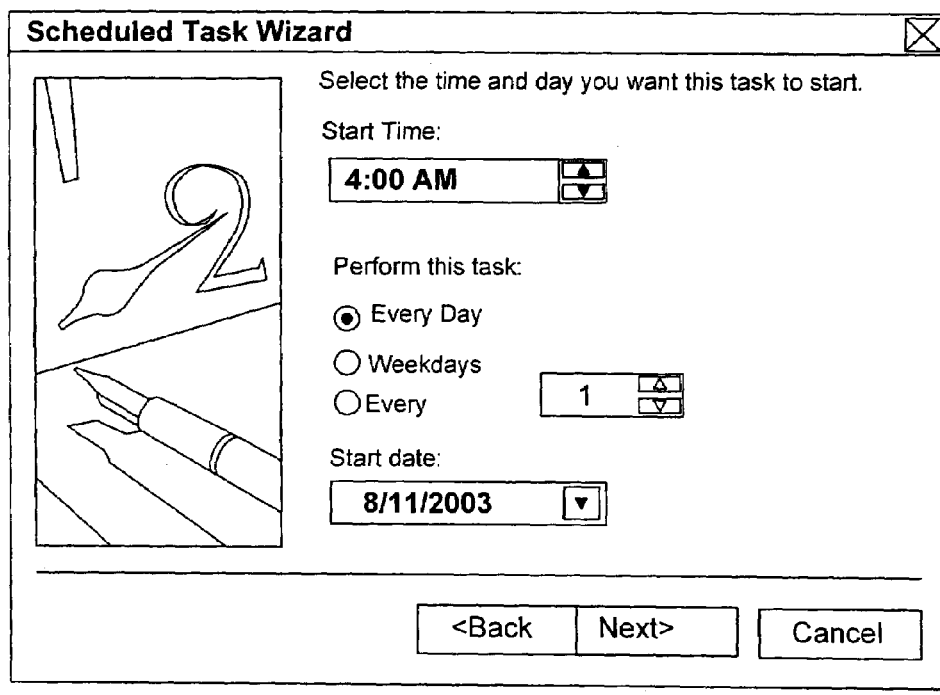
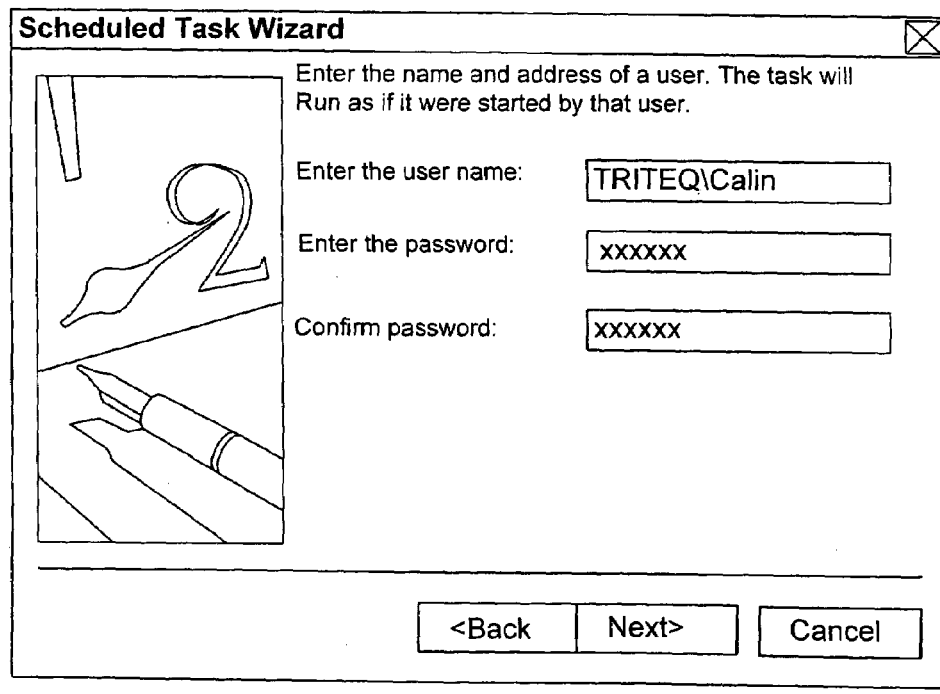

FIG. 20
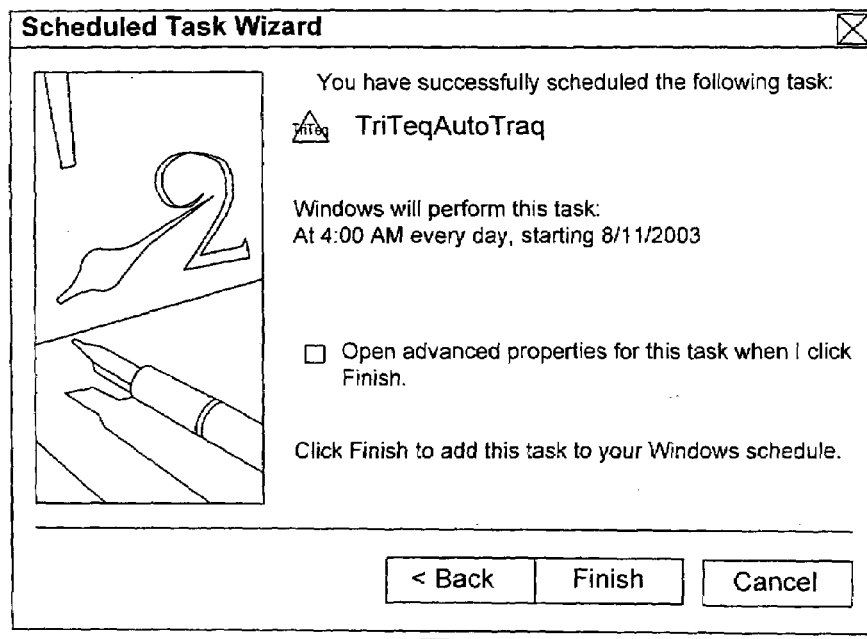
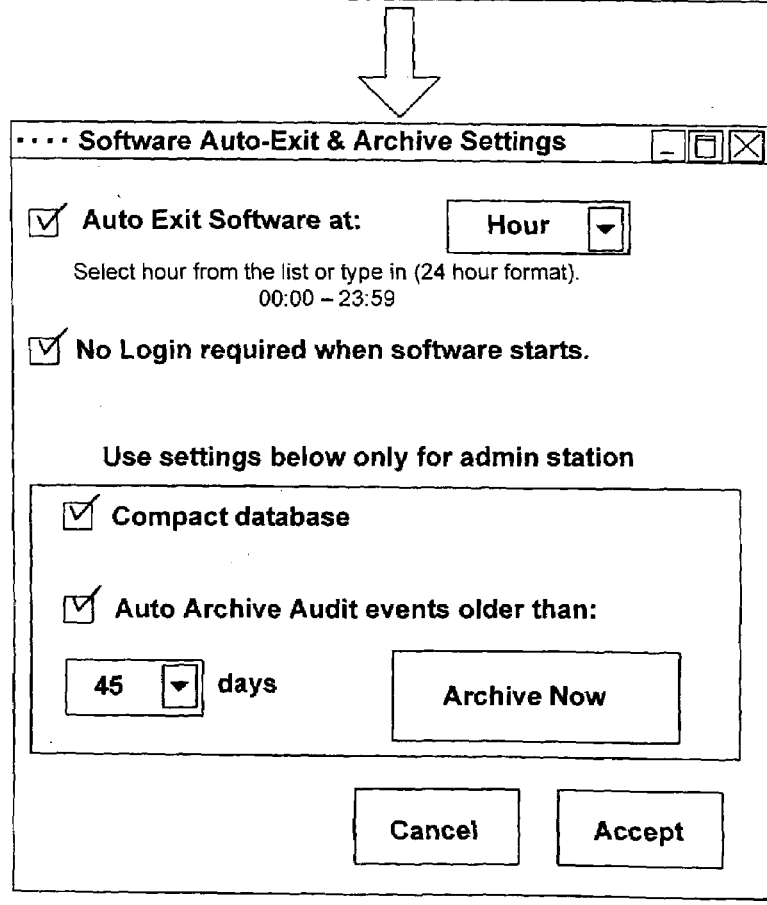

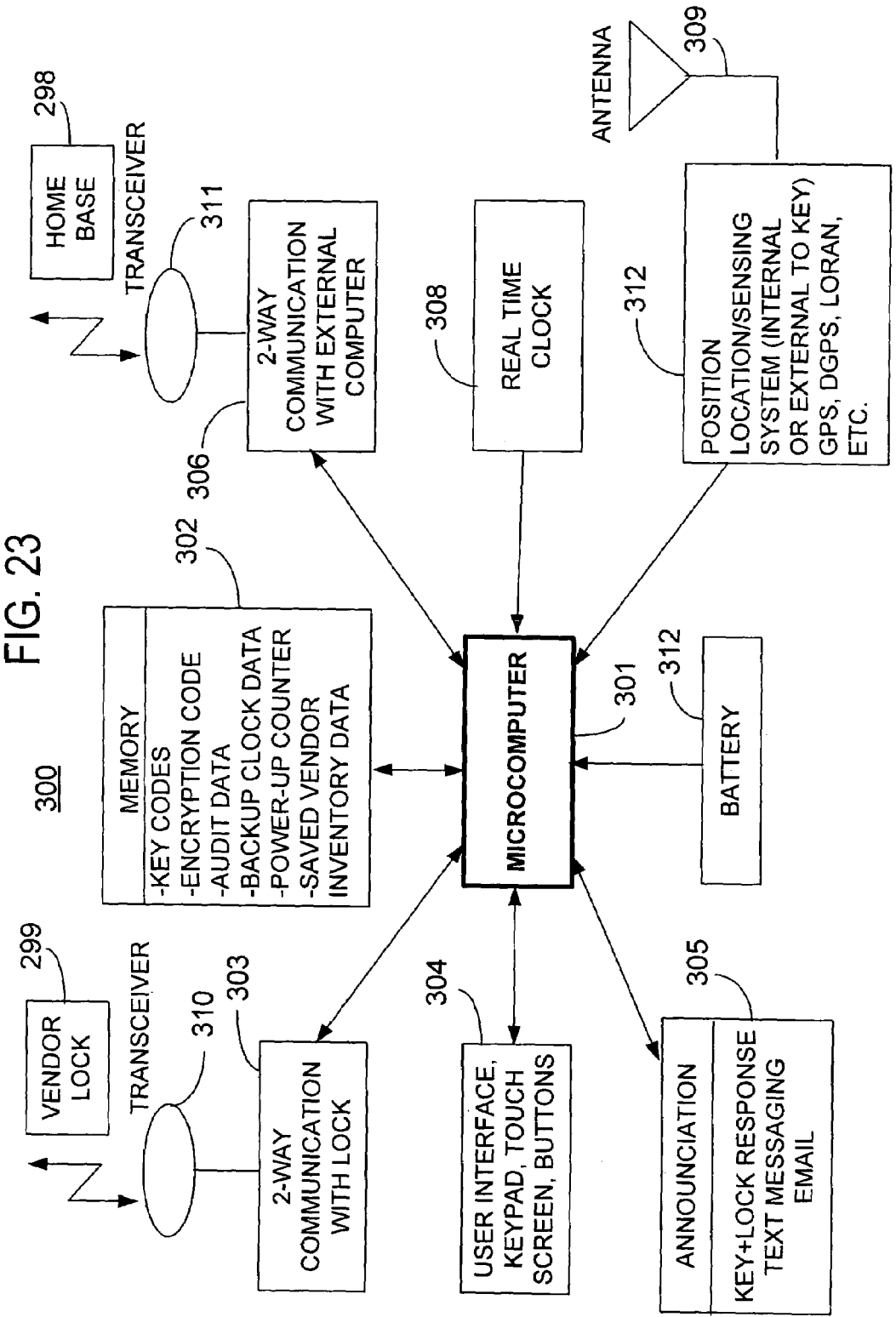

ELECTRONIC KEY-CONTROL AND MANAGEMENT SYSTEM FOR VENDING MACHINES

RELATED APPLICATION

This invention claims the priority of U.S. Provisional Application 60/528,831, filed Dec. 11, 2003.

FIELD OF THE INVENTION

This invention relates to electronic locking systems for vending machines and the like, and more particularly to a system and method for controlling and managing operations of electronic keys for vending machines and like enclosures.

BACKGROUND OF THE INVENTION

Mechanical locks and keys have been used on vending machines for over the past 50 years. Such mechanical locks and keys have many disadvantages in terms of mechanical problems, security issues, and difficulties in managing the usage of the keys. What is required is an electronic key and management system to overcome the management and security problems associated with mechanical locks and keys.

BRIEF SUMMARY OF THE OBJECTS OF THE INVENTION

It is an object of the invention is to use a convenient computer and database system to limit the operation of electronic keys.

It is another object of the invention to maintain the limit parameters of electronic keys with minimum computer interaction.

It is another object of the invention to quickly and easily customize the limits of the keys specific to the employee using the key.

It is a further object of the invention to easily identify in the database which employee uses which key.

It is an object of the invention to quickly display and record errors with refreshing the key such as low battery, clock, or memory malfunctions.

It is an object of the invention to limit certain keys that can be serviced from certain computers and databases.

It is an object of the invention to quickly display the present and previous limit status of each key or all keys and the limit parameters, including the exact time and day the key was last refreshed.

It is an object of the invention to enter information in the database about each lock such as the vending machine identification number and its location.

It is an object of the invention to collect the access activity data from each vending machine to determine each attempted access (successful or non-successful) of an electronic key for each vending machine. This collection may be via the key uploading, storing, and downloading this data or it may travel through some other network back to a computer and a database.

It is an object of the invention to download audit data from keys and to process this data and to load the data in the database in the background in order to speed up the refresh/service time of the keys.

It is an object of the invention to sort this data in terms of the vending machine being visited, the employee, the employee key, the type of access event recorded, and the time/date of the attempted access.

It is an object of the invention to sort this data in terms of the vending machine being accessed, the employee, the employee key, the type of access event recorded, and the time/date of the attempted access.

It is an object of the invention to sort data from electronic keys in terms of a multiple of combinations of the following parameters: the vending machine being accessed, the employee, the employee key, the type of access event recorded, and the approximate time/date of the attempted access.

It is an object of the invention to simultaneously (in the same refresh process) upload keys with limit parameter data and download keys with audit data information.

It is an object of the invention to maintain the access data with minimum computer interaction.

It is an object of the invention to maintain the key parameters and access data from more than one computer.

It is an object of the invention to provide a secure software installation system that will not allow unauthorized installation and/or use of the software.

It is an object of the invention to transfer, combine, and integrate the access audit data from the lock database to another database that compiles data for reporting purposes.

It is an object of the invention to insure the audit events cannot be deleted or changed for accuracy reasons.

It is an object of the invention to provide mechanisms to allow automatic purge and compression functions of the database to maintain it at full efficiency.

It is an object of the invention to control duplication and identification of key codes by controlling their ability to upload/download/reset its operational parameters through the specialized territorial coding parameters.

It is an object of the invention to allow the software to analyze the key data and confirm the key is operational.

It is an object of the invention to provide a hierarchical method of accessing software menus and features.

It is an object of the invention to provide warning messages for keys accessing or attempting to access locks defined in a different route or zone that the key is defined for.

It is an object of the invention to provide a fast method of sorting redundant data downloaded from a key.

It is an object of the invention to provide statistical reports related to the access attempts for each user, for each individual lock, for peak accesses during the day, week, or month for determining the average time between refills and average times between service calls.

It is an object of the invention to provide an unattended mode for refreshing keys.

It is an object of the invention to provide an alert mechanism to warn users about a key out of operation parameters, a key not programmed into a lock or an unlocked vending machine.

It is an object to provide multiple docking stations positioned in different physical locations to service keys by storing and retrieve data to and from multiple databases, usually one separate database for each docking station, and provide for the synchronize of the organization of the databases from time to time.

It is an object to provide multiple docking stations positioned in different physical locations to service keys by storing and retrieve data to and from a single database, usually located on a network.

It is an object of the invention to provide warning about possible lost keys.

These objects and other advantages of the invention will be apparent from the detailed description provided herein.

An electronic key and management system in accordance with the invention has multiple advantages.

Electronic keys can be programmed and assigned to certain employees. Electronic keys can contain electronic memory and an electronic clock so they can be tracked for their operation concerning what vending machines are attempted to be accessed and when.

Electronic locks can be programmed to contain individual electronic serial numbers so each lock can be identified in a database by its location or asset number. This serial number is not involved in access control.

Electronic keys can be programmed to limit their operation and use depending on an employee's work schedule and/or the employers requirements.

Electronic locks can contain electronic memory to store the audit information of exactly what electronic key attempted to access it and this data can be downloaded to a data storage device or an electronic key so the data can be transferred back to a central database.

Personal computers, visual basic programs and databases can be used to manage, interact and store some or all of the data required to perform the management of the keys and audit trail data.

Various refresh/docking station and database configurations (single, multiple, local, networked) will provide numerous operational benefits.

BRIEF DESCRIPTION OF THE DRAWINGS

FIG. 1 is a schematic representation of an embodiment of a key management system including a personal computer having a local database and software program, and cradle that functions as an interface for communications between an electronic key and the computer;

FIGS. 2A and 2B are schematic diagrams showing the user interface screen and process for registering the software and the cradle of the key management system;

FIGS. 3A, 3B and 3C are schematic diagrams describing a start-up and refresh sequence of the keys;

FIG. 6A is a schematic diagram showing a process of collecting electronic lock ID information;

FIG. 6C is a schematic diagram showing an alternative process for collecting electronic lock ID information;

FIGS. 9A and 9B are schematic diagrams showing user interface screens for a process of editing key limit operational parameters;

FIG. 16 shows user interface screens for generating an export file for synchronizing distributed databases;

FIGS. 18-20 show user interface screens involved in scheduling the operation of the key management system for auto start up;

FIG. 23 is a schematic diagram showing in functional blocks an electronic key that has a position sensing component for detecting the locating of the electronic key during field operation.

DETAILED DESCRIPTION OF THE INVENTION

Figure 2B:
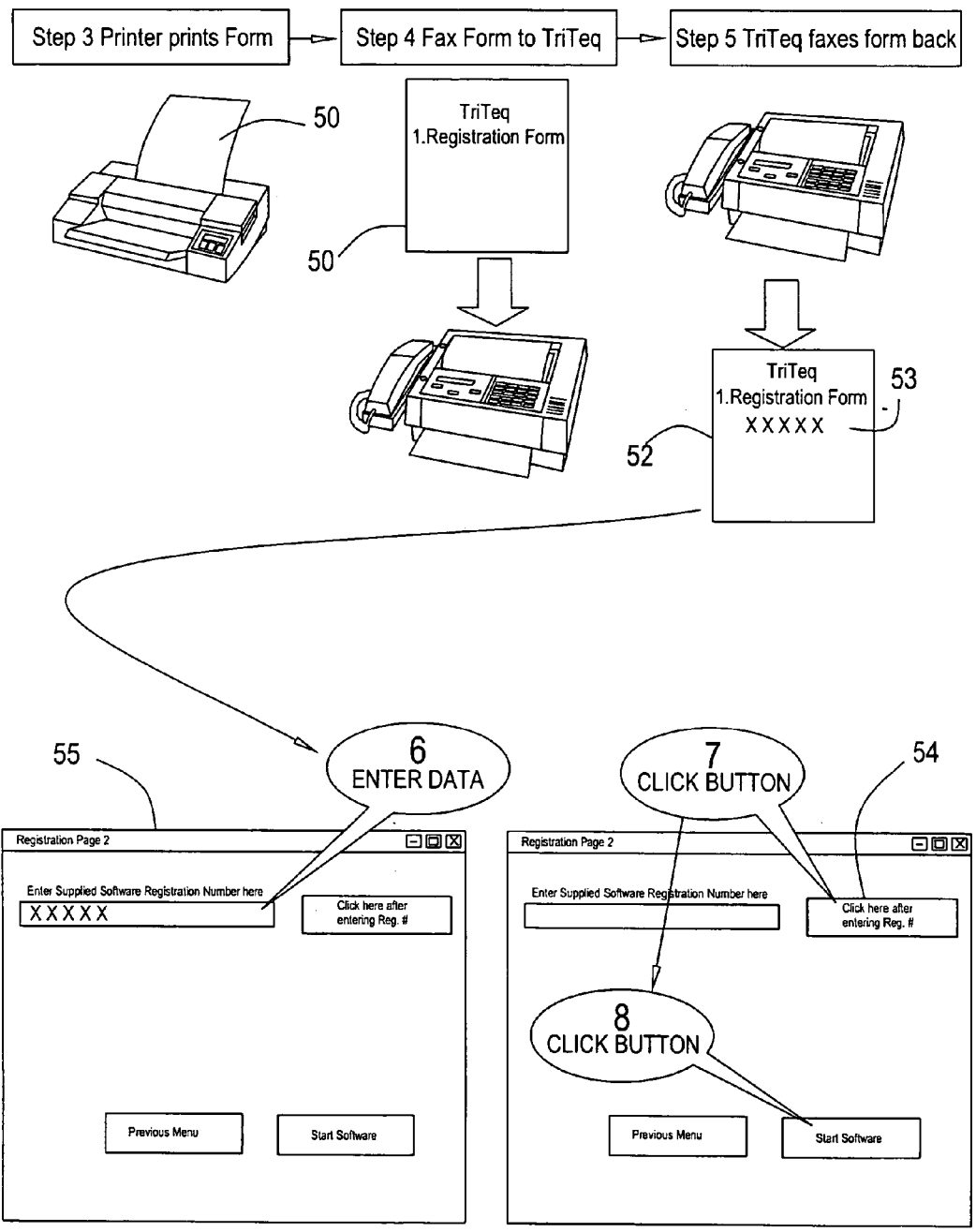

The present invention provides a system and method for managing electronic keys used for accessing vending machines or the like and for managing audit data collected by the electronic keys from the vending machines. In an embodiment shown in FIG. 1, the electronic key management system (or station) 30 includes a computer 32 which may be a desktop personal computer (PC), with appropriate computer software and hardware for carrying out the functionality of key management and database operations. The software program 34 for key management and database operations may be a Visual Basic program executing on the PC. The computer 32 also includes a database for storing data for key management and audit data collected from vending machines. As used herein, "database" may include data files as well as a database program. In one implementation, the database 35 may be a Microsoft ACCESS database residing on the PC 32.

As illustrated in FIG. 1, the electronic key 31 includes a status indicating device which may be an LED light 38, and a push button 39 that when pressed causes the key to start wireless transmission. To communicate with the electronic key, the key management system 30 includes an interface device for forwarding and receiving communications to and from an electronic key. In the embodiment illustrated in FIG. 1, the interface device is in the form of a cradle 36 (or docking station) that interfaces the key to a communication port 33 on the PC 32. The cradle 36 has a receiving place for receiving the electronic key, and indicators such as a ready/wait light 40.

In accordance with a feature of the invention, the database 35, software 34 and cradle 36 transceiver interface systems are limited for secure operation on only one particular computer 32 by means of registration. The software programs and the cradle can properly function only after they are registered with an authorized control center. Thus, a thief cannot install stolen components on a computer at an unauthorized location. The steps of an exemplary registration process are described with reference to FIGS. 2A and 2B. FIG. 2A shows an interface screen that presents a registration form 42 and a Software Registration Menu. After the software programs are installed on the computer 32, a user may click on a "registration" tab in the menu bar to bring up this registration form. To fill in the required data, the user looks at the bottom of the cradle 36 for the cradle serial number, and enters this number into the form 42. The user looks at the compact disc (CD) containing the key management software for the CD serial number, and enters it into the form. The user also fills in other required information, such as contact information including the bottler name, contract name, address, phone number, etc., into the registration form. Once the registration form 42 is properly filled, the user clicks on the "Generate System ID#" button 44. After this button is pushed, the software program generates a system ID number for this system based on the serial numbers and/or other information entered by the user. The system ID number appears at the bottom of the form 42 under the "Get Registration #) button 45. The user then clicks on the "Get Registration #" button. In response, the software program generates a registration form containing the user-entered information and the system ID number, and sends the form to the printer for printing, as illustrated in FIG. 2B. This registration form 50 is then sent, for example via facsimile, to the control center (e.g., TriTeq Corporation) so that the control center can register the key management system using the system ID number. The control center then issues a special code 53 as a registration number for the user's system. The special code is generated based on the system ID number and possibly other information provided by the registration form 50. This registration number 53 may be sent to the user in a registration response form 52 that may be transmitted via facsimile to the user. The registration number may also be sent via other means of communication, such as email, mail, or voice communication (e.g., a phone call). The user then goes to the next screen 55 of the user interface for software registration, and enters the received code 53 into a provided field. After the user clicks an Enter button 54, the software stores the entered registration number in a special memory location.

The registration process described above links together the serial numbers assigned to and/or embedded in the software 34, the interface cradle station 36, and the computer 32 to create an authorization number stored in the database 35. Each time the software 34 is restarted, it reads the serial numbers of each of the components to calculate the authorization number, and then compares this number to the authorization number in the database to make sure they match before operating. If the calculated authorization number does not match the stored authorization number, the software does not allow the user to access the system management functions, and the system is inoperative.

Figure 3B:
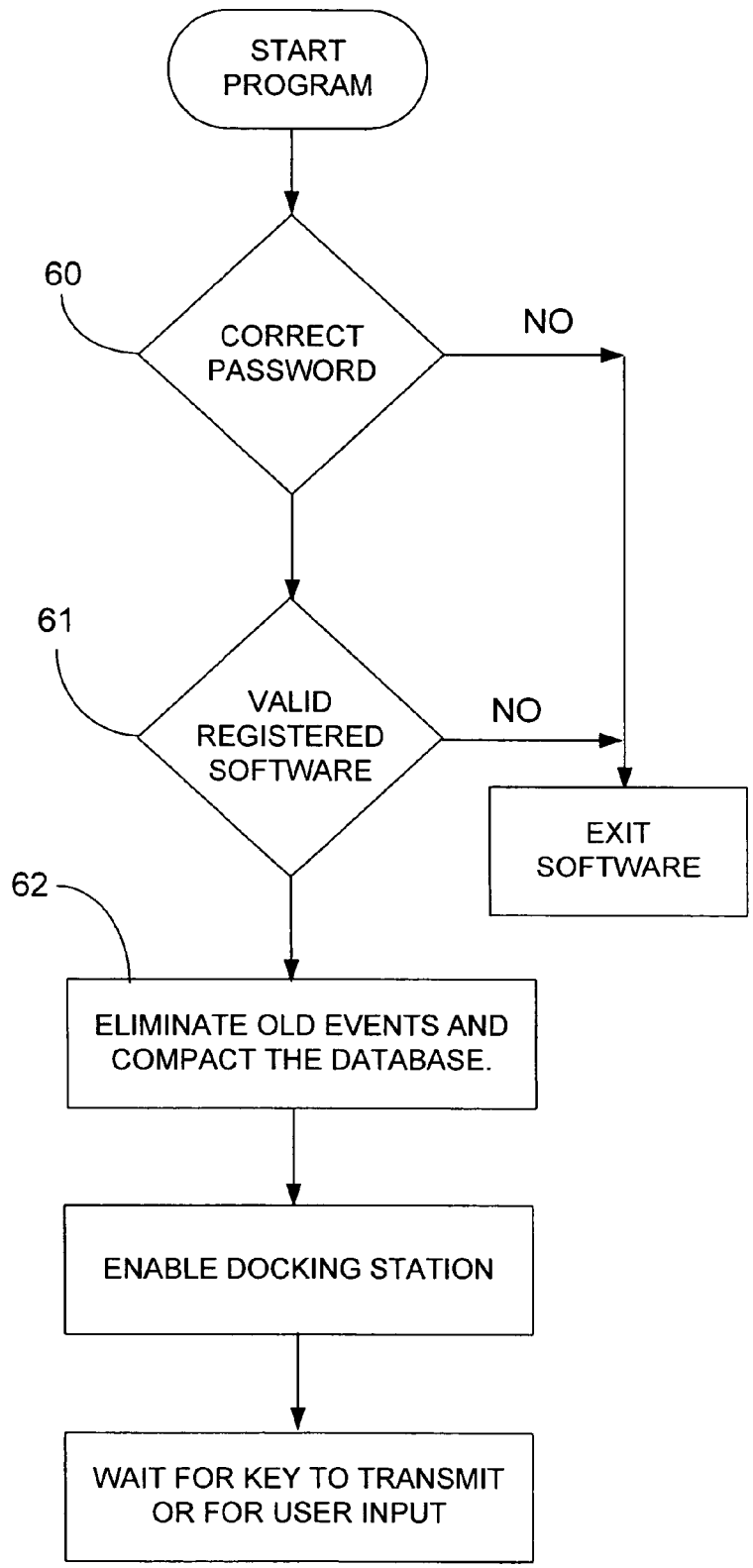

FIGS. 3A & 3B describe how the database interaction with the docking station or cradle is initiated by starting the software system which allows database accesses and data transfer to/from the database. One password is optionally required to initiate the "User" operation mode. As shown in FIG. 3A, after the software is started, the software presents a window 58 on the computer screen for the entering of a password. The software then presents a key control window 60 that contains various control parameters or limits for controlling the operations of the electronic key. For instance, the key control screen in FIG. 3A includes fields for the name of the user of the key, the ID number for the electronic key, the key type, the total number of accesses allowed, the allowed number of accesses per day, the start and end times of the operative period of the day, the expiration day and time, and the number of days in which the key is valid, etc.

Referring to FIG. 3B, when the software program 34 is started, the software presents the password window as shown in FIG. 3A and waits to receive a user mode password. When a password is received, the program determines whether the password is correct (step 60). If the user password is incorrect, the software program exits from operation. If the user password is correct, the program determines whether the system is properly registered in the way described above. If the system is registered, the program works on the database 34 by eliminating old events and compacting the database (step 62). The program then turns on the cradle 36, and waits for transmissions from an electronic key docked in the cradle.

Figure 3C:
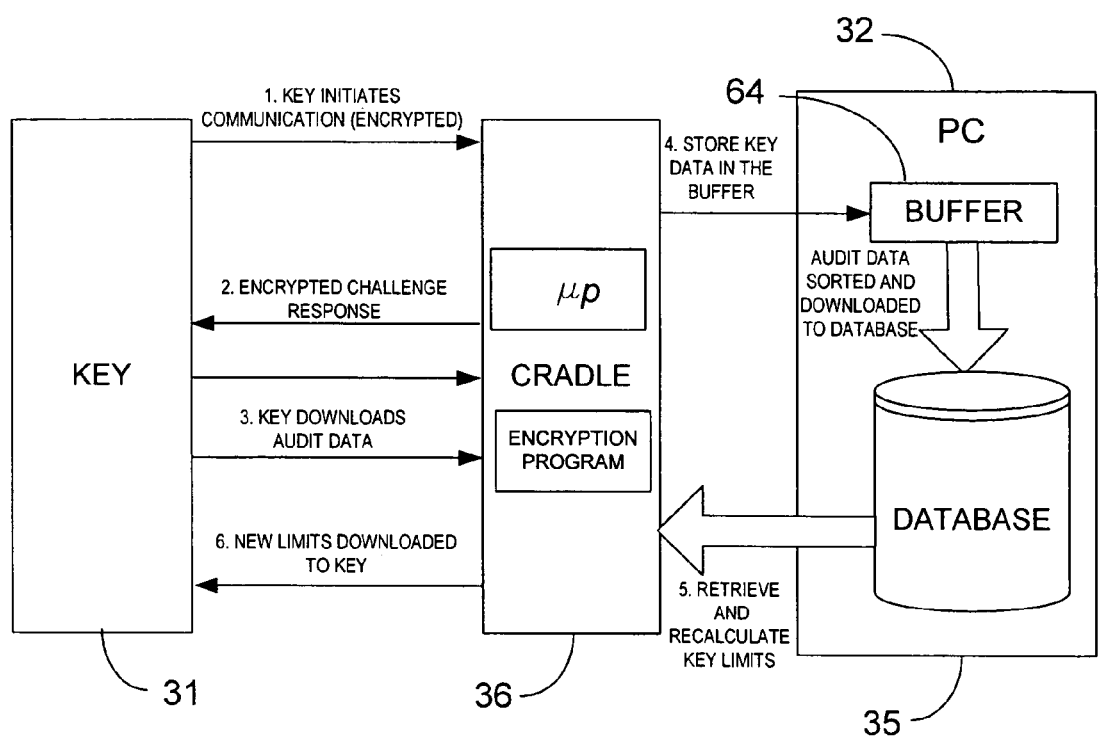

Turning now to FIG. 3C, to initiate a docking or refresh operation of the key 31, the key is placed within communication distance of the cradle 36. As shown in FIG. 1, the cradle 36 may have a receiving location on its top into which the key may be placed. The user then presses the transmit button 39 of the key 31 to cause the key to start transmission. The transmission from the key is received by the cradle 36 and forwarded to the computer 32. Likewise, communications from the computer 32 are sent to the cradle 36, which then transmits the communications to the key 31. FIG. 3C illustrates that first the key 31 and cradle 36 exchange encryption messages to ensure that an authorized key is communicating with the station. To that end, the cradle 36 includes a microprocessor for providing the processing power and has software programs including an encryption program for handling the encryption/decryption involved in the challenge-response communications and any subsequent communications. Next, if the key contains access audit data collected from vending machines in the field, the data is downloaded from the key and stored in a buffer 64. The data in the buffer 64 may then be sorted and loaded into the database 35. The new operation limits (see FIG. 3A) pre-set by a supervisor for that electronic key are then downloaded into the key 31.

In accordance with a feature of the embodiment, the operation of refreshing the key and downloading data from the key is automatic, without requiring a user to oversee or activate each of the steps involved in the process. All the user has to do to initiate the key refreshing operation is to place the key 31 in the cradle 36 and press the transmit button 39 of the key, and the software program 34 will finish the operation without requiring further attention from the user or system administrator. During this process the database 35 proceeds to service the key without prompting the user to enter any information or data at the computer either before or after the key is initiated. As a result, the key refreshing operation may run in the background, without the need to have an open window on the computer screen, thereby allowing the computer 32 to be used for other operations such as word processing or communications over the Internet. To service the next key, the previous key is removed, the new key is inserted and its transmit button is pressed. Again, the database proceeds to service the key without prompting the user to enter any information or data at the computer either before or after the key is initiated. The docking or refresh operation can be performed without the supervisors present, which allows the system to perform without daily maintenance.

Figure 4A:
FIG. 4A is a schematic diagram showing user interface screens for a user to entering supervisor and administrator modes.
Figure 4B:
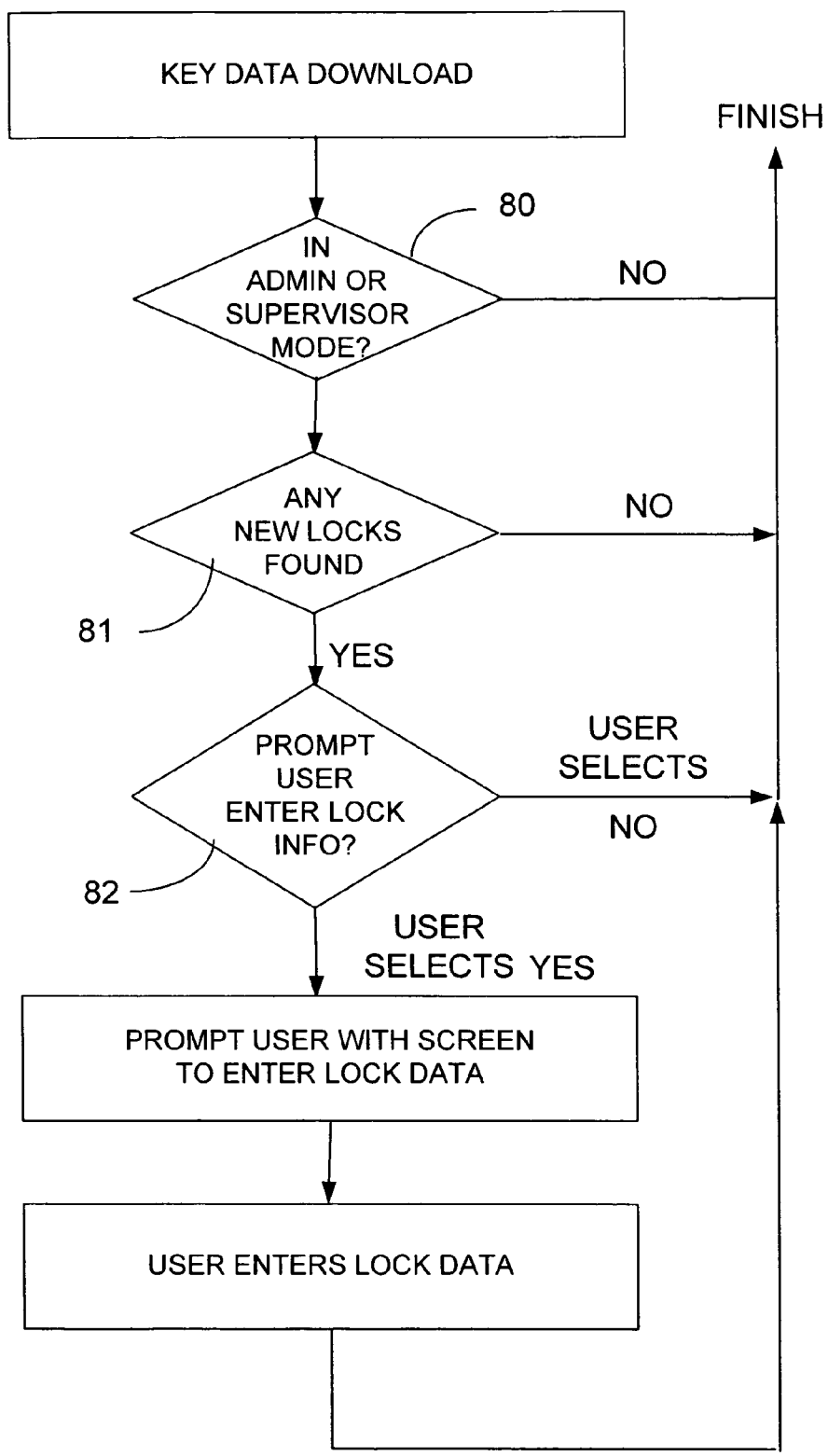
FIG. 4B is a flow chart showing a process for a user to enter electronic lock information.

FIGS. 4A & 4B illustrates an advanced set-up feature of an embodiment of the key management system that is only accessible by entering a secure operating mode, which may be either the "Supervisor" or "Administrator" modes. As shown in FIG. 4A, the software first presents a key control window 70 similar to that in FIG. 3A. By clicking on the Mode option in the Menu bar, a user can select to run the software in a Supervisor mode or a User mode. Selecting the Supervisor mode causes the software to open a password entry window for either the administrator or supervisor. The user then enters the password as an administrator or supervisor into the field provided. In one implementation, an administrator oversees multiple supervisors, while each supervisor supervises multiple users to which electronic keys are assigned. When a user signs in as the administrator, he can use the software to add or remove supervisors from the key management system as well as administrating the functions of the key management system. A supervisor can use the software to add or remove electronic keys and/or key users, and set or change key limit parameters.

As shown in FIG. 4B, when audit data is downloaded from an electronic key, the software program determines whether it is in the administrator mode or supervisor mode (step 80). If neither, the program finishes the key refreshing operation by loading new key parameters into the key. If the program is in the administrator or supervisor mode, the program checks the audit data received from the key to see whether the data contains identifications of any vending machine electronic lock that is not found in the database (step 81). In this regard, the audit data stored in an electronic key are collected from electronic locks in vending machines accessed using the electronic key. The audit data collected from an electronic lock contains, among other things, a serial number of the electronic lock. It is possible for the electronic lock of a vending machine to be programmed in the field to work with a given key before the ID number of the lock is registered in the database of the key management system. If the key management program finds a new lock serial number in the audit data downloaded from an electronic key, it prompts the user to enter the lock information into the database (step 82). If the user selects not to do so at that time, the program continues the key refreshing operation. If the user selects to enter the lock information, the program present a user interface window (step 83) to allow the user to enter information about the electronic lock (step 84). The program then continues to finish the key refreshing operation.

In accordance with an aspect of the invention, the electronic keys contain certain key codes for access authorization purposes. It is desirable to limit which keys can be serviced by which computers such that stolen or lost keys cannot be serviced at computers they are not authorized to be serviced at. Thus, the database preferably contains a feature to limit which serial number sequence keys it will service and which it will not service. If a key is not in this serial number range, the database, computer, and software will refuse to service it. The limit parameters are usually entered into the database by a supervisor just after installing the software.

Key Set-Up

Figure 5A:
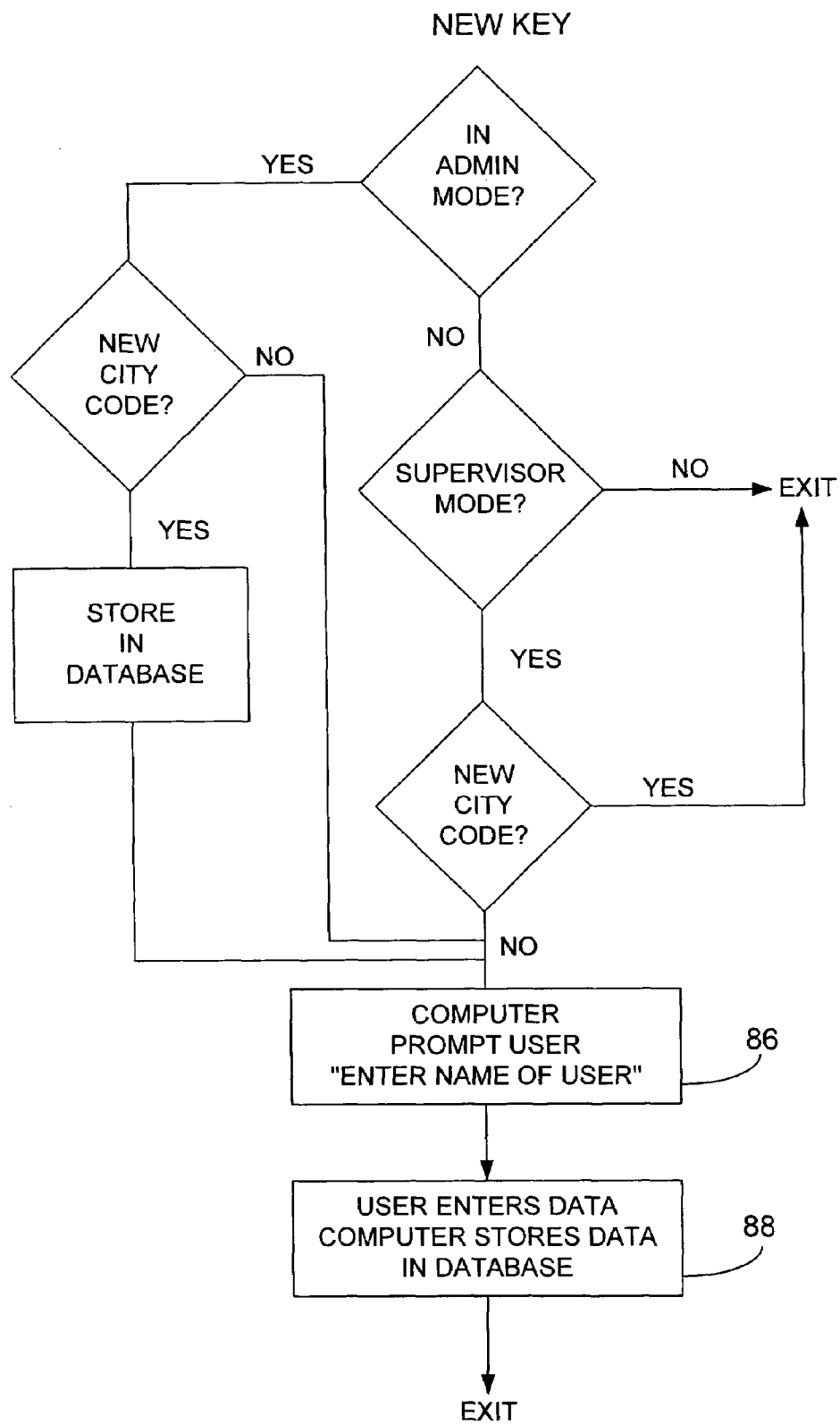
FIG. 5A is a flow chart for a process of starting up or logging in new keys.
Figure 5B:
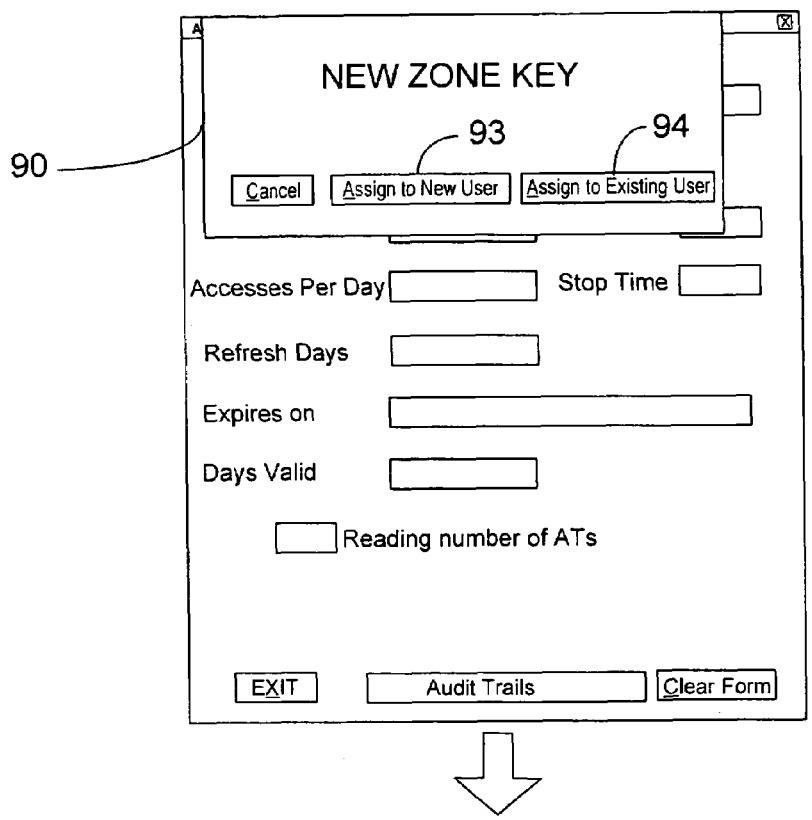
FIG. 5B is a schematic diagram showing user interface screens for the operation of entering key user information.

Certain set-up procedures are implemented in the system in order to make the security features of the system useful and easy to use. FIGS. 5A & 5B illustrate these features. First, the electronic keys need to be assigned to the employees. This is accomplished by a simple operation, as shown in FIGS. 5A and 5B. First, a new key never previously initialized (or not contained in the database) is placed within communication distance of the cradle station interface and the transmit button of the key is pressed. Next, the supervisor is prompted to enter the name or identifier of the user to which the key is to be assigned (step 86). The supervisor enters the required data, and the data is stored in the database (step 88). If it is for a new key user, the process is described in FIG. 5B. The software recognizes automatically that a new key is introduced into the system. In one implementation, the key indicator light stays "ON" and the cradle light stays "RED" when it is communicating with the key. Afterward, the program provides the user interface screen 90 shown in FIG. 5B to prompt the supervisor or administrator to assign the key to either a new user or an existing user. If the supervisor presses the "Assign New User" button 93, the screen 96 appears for the supervisor to enter information regarding the new user who is going to use the key. After entering the information, the supervisor clicks on the "Accept" button, and the new user information is stored in the database 35. Next, the transmit button 39 of the key is pressed again, and the program presents the key control window to allow the supervisor to set the limits for the key operation. When the user enters this name, the database links the serial number embedded in the non-volatile memory of key with the name for reference purposes. Also, a set of default limits are assigned to the key in the database, such as 200 total accesses, 20 access per day, 6 AM to 6 PM operation, 7 days of operation, Monday through Friday operation. FIG. 5A also illustrates how only the supervisory or administrator sets the database up to allow the territory code to communicate to the database.

In managing the keys in an on-going basis, the supervisor may use the system to check the limit parameter status of the keys to quickly see which keys are either expired or approaching the end of their operation limit parameters. This is accomplished for example by selecting the "Edit Key Limit" menu on the main screen of FIG. 4A. In response, the program displays a list of the registered electronic keys and for each key the expected time and date the key will exceed its limits in a row and column format for viewing by the user.

Figure 6B:
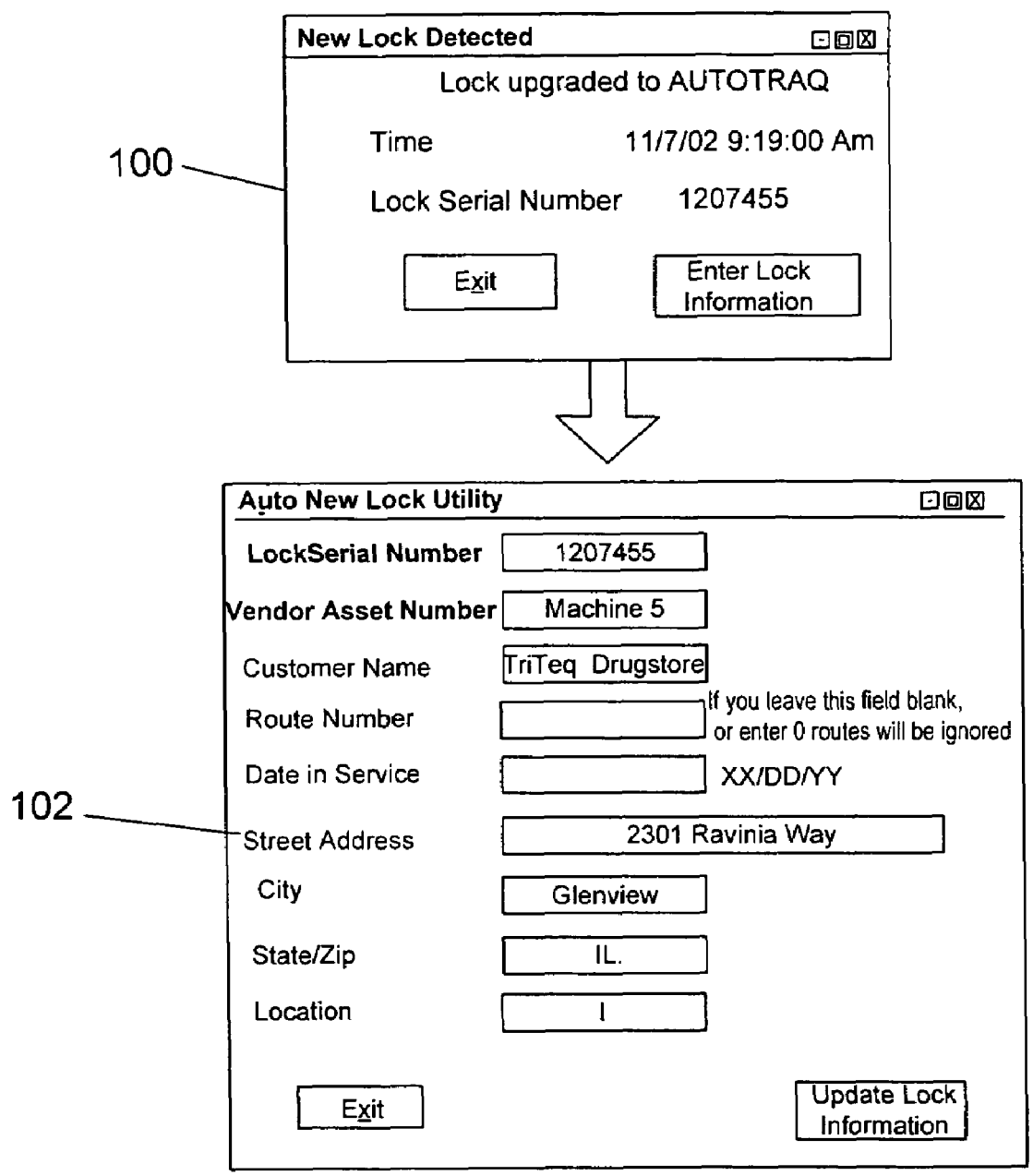
FIG. 6B is a schematic diagram showing user interface screens for prompting a user of the key management system to enter information regarding a new electronic lock.

Next, the electronic locks to be accessed with the keys need to be assigned to Customers, locations, and/or asset identifier numbers (identification data). FIGS. 6A-6C illustrate two methods. This procedure is necessary because the lock is initially identified by the database using a lock serial number embedded inside the lock non-volatile memory that is not easy or obvious for the user of the system to reference or identify to. Once each lock is referenced to a number or name that the user can more easily identify with, understanding and using the audit trail data will be more likely. There are several possible procedures for entering the lock information. Each procedure is possible even if the lock is remotely located from the computer and either cannot or does not directly transfer its serial number to the computer and database.

In one procedure shown in FIG. 6A, the lock serial number 90 is printed on a label 91 attached to the lock as an alphanumeric number or as a barcode or other identifier. This number can be visually read and recorded in a form 93 along with the customer, location, and/or asset identifier number for the lock, and then manually entered into the database 35. The disadvantage of this system is if the serial number label is lost or not legible, it would be difficult to identify the electronic lock.

In another procedure also shown in 6A, the lock serial number 90 is not printed on a label, but is read from the lock by a diagnostic tool 92 to make certain the correct serial number is recorded. This number can be visually read from the tool display, recorded along with the customer, location, and/or asset identifier number, and manually entered into the database. In this procedure, a lost label on the lock will not impede the process.

FIG. 6B describes the manual entry process of entering the collected lock, vending machine, and location information and entering it into the database. In the shown example, a key assigned to a user "Gary Myers" has visited a new vending machine that are not registered in the database 35. The electronic lock information is time-stamped into the key when the key is used to access the lock. When the key user returns to the key management system 30 and places the electronic key into the cradle 36 for key refreshing operation, the lock information is downloaded from the key to the computer. The program notices that the downloaded key data contains new lock information not already entered into the database. For each new electronic lock identified in the key data, the program presents a "New Lock Detected" window 100 on the computer screen showing the lock serial number and the time at which the lock was accessed. When the user clicks the "Enter Lock Information" button, the program presents a "New Lock Data" screen window 102 to allow the user to enter detailed information about the vending machine containing that electronic lock, such as the vending machine asset number, customer number, route number, date in service, and location address, etc. After entering the information, the user clicks the "Update Lock Information" button, and the information is stored into the database. The program than presents another "New Lock Data" screen for the next new lock identified in the downloaded key data.

In another procedure shown in FIG. 6C, the user has an electronic tool 94 that electronically reads or scans the serial number 90 from the electronic lock (either by communicating with the lock or reading the printed label) and electronically reads or scans an identifier label 95 on the vending machine 96. This electronic reader or scanning device links the two identifier numbers together in memory. This procedure can be repeated for many vending machines for as long as the reader does not run out of memory. After the scan/read process is completed, the reader 94 can download its data into a computer that can ultimately transfer this data to the database. In this procedure, the lock and vending machine data is electronically linked, so the manual data entry procedure can be avoided.

Lock-Database Data Exchange

In accordance with an aspect of the invention, data may be exchanged to/from electronic locks of vending machines and the key management database 35. One method involves using an electronic key to collect the audit information in the lock and ultimately transfer this data to the database 35. In alternative embodiments, wireless communications may be used for the data transfer. For example, the lock can communicate directly (or indirectly) through a wireless medium to a computer transceiver interface to transfer the data to/from the database. The preferred embodiment described below uses the electronic keys to transfer the access limits and the audit trail information, but this invention is not limited to this method.

Figure 11:
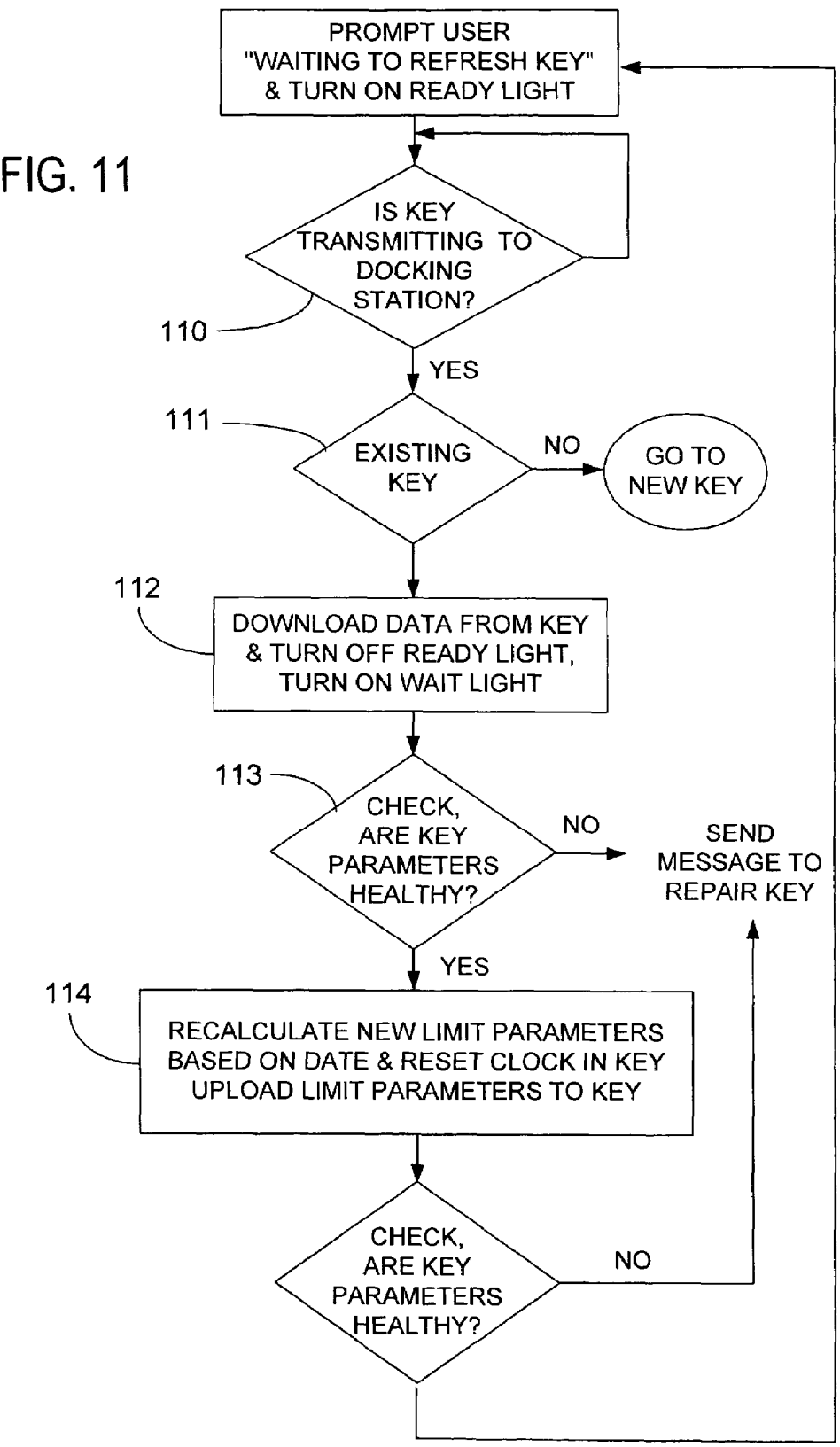
FIG. 11 is a flow chart showing a process of refreshing the memory of an electronic key.

During service of the key 31, data is exchanged from the key to the computer 32 and from the computer to the key as described in FIG. 11. Before this exchange takes place, the cradle 36 is in the receive mode, wherein any transmission signal from the key will initiate the data exchange process. The timing and sequence of the data exchange is automatic, and it is only necessary to initiate one start operation at the key to exchange the data in both directions. The communication between the key and the cradle is preferably protected by bi-directional encryption methods. During the process, the program determines whether the key is transmitting to the cradle (step 110). If the key transmission is received, the program determines whether the key is an existing key or new key (step 11). If the key is an existing key, the data stored in the key is downloaded from the key (step 112). The program then checks whether the key parameters are healthy (step 113). If so, the program retrieves or recalculate new limit parameters for the key, reset the clock in the key, and upload the limit parameters into the key (step 114). The computer will proceed to service the key provided it is authorized to do so. Such authorization may be provided in the database locally stored on the computer hard drive. One can have such authorization at multiple computers if the authority is granted.

In the event of multiple computers authorized to service the same keys, rather than having multiple computers with multiple databases local to the respective computers, it may be more convenient to have one database residing on a central server or shared drive so more than one computer and cradle can be used to service the keys. Thus, the authority to service the key resides in one database and all of the data exchanged is managed in one database rather than multiple databases. In that case, the data exchanged from the key to the computer may be immediately transported to the database or stored locally at the computer and later processed by the computer and loaded in the remotely located database. This may be a more desirable process since the data transfer may be very time consuming during heavy traffic hours on the network and may better and more reliably be transferred during low traffic times.

During this data exchange process, the health of the electronic key can be diagnosed. For example, the clock in the electronic key is read by the computer and compared to the clock in the computer. If there is a mismatch in time, the computer can alert the supervisor that the key can a faulty clock or battery. Likewise with the memory in the key. If the data exchange process is not successful, the battery or the memory may be suspect to be faulty, and the computer will display this fault for the user or the supervisor so the battery can be replaced or the key taken out of service.

Audit Data

During service of the key, the vending machine audit data collected by the key is downloaded from the key to the cradle 36, next to the computer memory buffer 64, and last to the database 35 of the computer. The data is managed by the supervisor by allowing each lock serial number to be identified in the database by the customer, location, and/or asset identifier number as previously described is set-up. The software may allow several options for managing this data in the database. This process is executed only one time for identifying the asset number, and one time for each time the vending machine is assigned to a customer or a location. The processes for identifying this data are as follows:

Pop-Up Request Process

FIG. 6B illustrates this process. In this process, the software will run a test while in the supervisor mode that will search the lock serial number in the data base. If no such number is identified, the software will prompt the supervisor to enter the data. The software will provide as much information about the vending machine as possible to help for the identification, such as the time and data the lock was first put into service or accessed.

Manual Process

The software will provide a menu to select the identification process. Next, a drop down list will list in numerical order all lock serial numbers that are not identified. Next, the user will select the lock that he/she wishes to identify. After selected, a screen is provided to enter the data. Also provided is a field for entering the effective data in case the identification data is entered several days or weeks after the data the data is valid.

This process can also be executed when viewing audit events from the database. In this situation, the lock serial number is displayed to identify the vending machine (in lieu of the vending machine asset number, customer, and location data). By selecting this number from this display position and clicking, the screen to enter the vending machine data will pop-up for ease of data entry.

FIG. 6B also illustrates that this process is also used after a lock is identified but the user wishes to change or modify some of the data, such as changing the customer information or location if a vending machine is moved or relocated. In this situation, the effective date field is used to properly record the exact date the change took place in case the data entry follows the change by a delay period.

Automatic Process.

It is possible for the identification data to be transferred automatically into the lock database. This identification data will be entered separately from another computer and/or database which separately contains the vending machine identification data.

Figure 7:
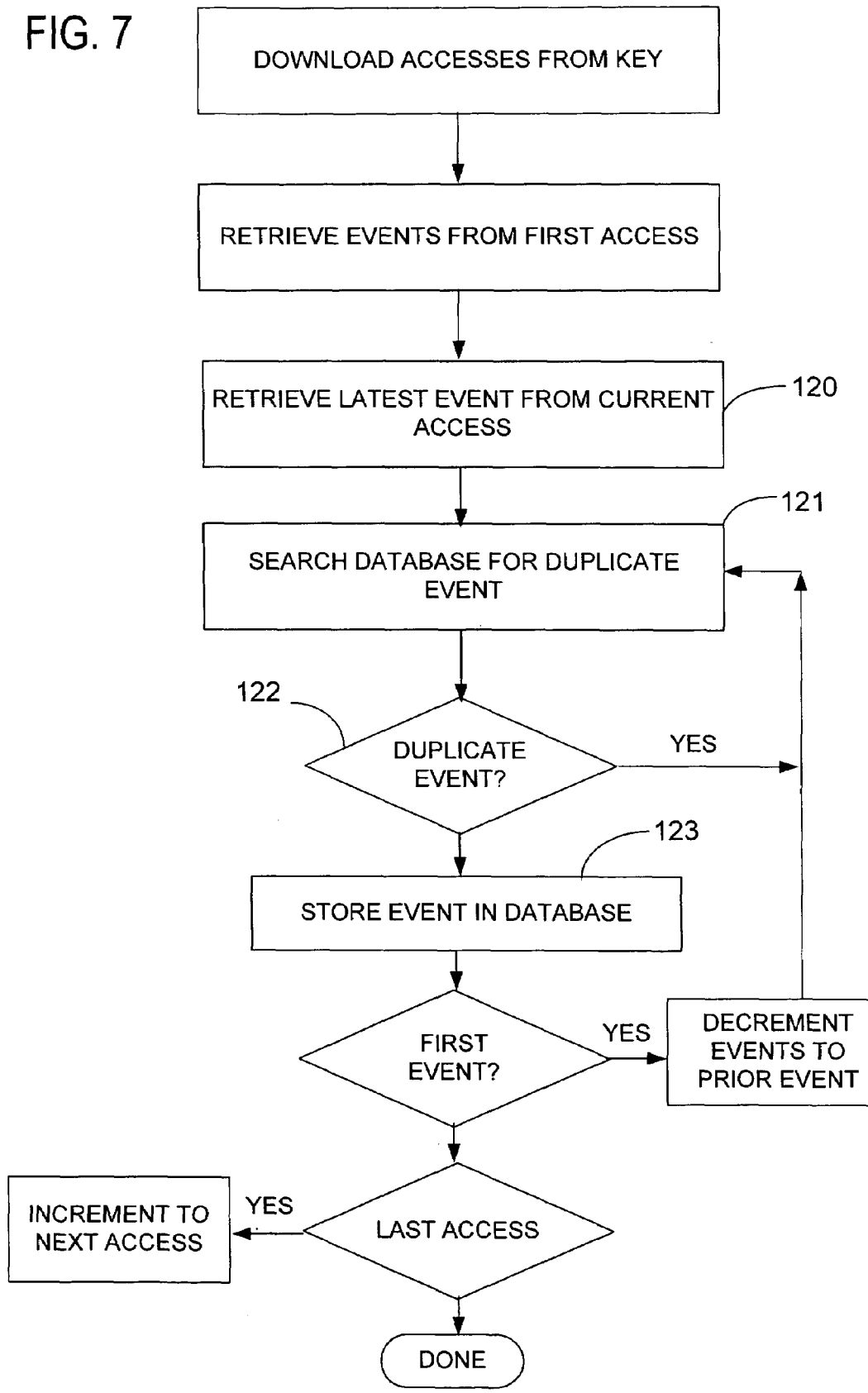
FIG. 7 is a flow chart describing a process of receiving and storing audit data.

Referring now to FIG. 7, as audit data is received from the key it is compared to previous data in the database. Since one or more key may bring duplicate access audit data back to the same database, it is necessary to compare the new data received from the keys with the data presently in the database and discard the like data so duplicate access data is not stored. To that end, when the program receives data downloaded from the key regarding an access attempt event (step 120), it searches the database for any event that is duplicate to the downloaded event (step 121). If a duplicate event is found in the database (step 122), the downloaded event is discarded. Otherwise, the event is stored into the database (step 123), and the program moves to the next event described in the downloaded data.

If access data is determined to be new, it is stored in the database 35. Suitable data sorting techniques are preferably used in order to efficiently store this data, and to efficiently retrieve this data in the future, and in the future compare this data to new data collected. The software shall be configured such that the audit information in the database cannot be modified or deleted, either accidentally or on purpose, in order to preserve the integrity of the security monitoring system. After audit data is stored in the database, certain data sorting techniques are required to make the viewing of the data useful.

Figure 8:
FIG. 8 is a schematic diagram showing user interface screens for displaying audit trails data collected by electronic keys from vending machines.

For example, FIG. 8 illustrates it is possible to sort and view the data by Access, by Driver or Employee, by Asset number, or between certain time and date periods. Each of these sort parameters can be combined to sort multiple combinations of parameters. Also, as the audit information is displayed, unusual activity that occurred before or during the access event can be displayed, such as Battery Removed (from key), Bad Route, Limited, and Unauthorized. To view the audit trails data, the user either clicks the "Audio Trails" button at the bottom of the Key Control Data screen 126 or use the task bar menu. This function is only available to supervisors and administrators. The program then displays the audit trails screen 128. The bottom portion of the screen 128 presents sorting options that allow the data to be sorted in various ways, such as by time, access, key user, or asset number, etc. Different combinations of these options may be used to refine a search.

The audit trails data may also be printed. In one implementation, the printing options available are "Automatic Audit Printing" and "Print Current Screen." Automatic printing allows for printing when a key refresh is executed and prints all the new events the key has encountered. The audit screen does not have to be displayed on the computer screen to enable printing.

Limiting Operational Parameters for Keys

Limiting operational parameters are available for keys. To ensure the security of the system, in a preferred embodiment such new limits can be assigned only when the computer is in the Supervisor or Administrator modes. FIGS. 9A-9C and FIG. 10 illustrate the process.

Figure 9A:
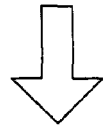
Figure 9C:
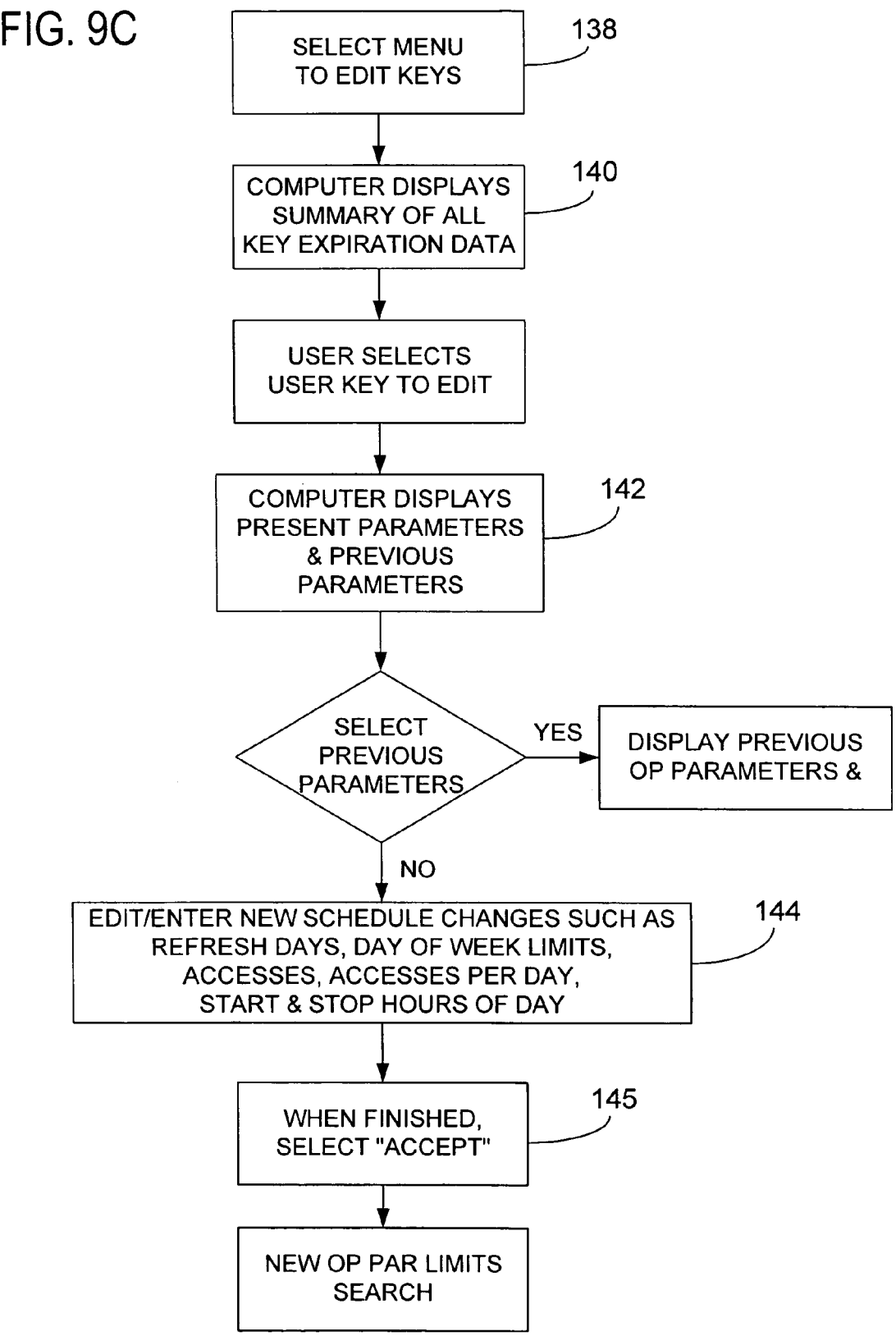
FIG. 9C is a flow chart showing a process of editing key limit parameters.

In FIG. 9A, if the supervisor wishes to assign a custom (non-default) set of parameters to this key, he selects the "Edit Key Limits" option in the menu bar of the screen 130 and then selects the "Set User/Key Limit" option from the drop-down menu (step 138 of FIG. 9C). In response, the system program presents a drop-down list 132 of keys (by names assigned to the keys) which also displays the expiration dates of the keys (step 140 of FIG. 9C). Next, as shown in 9B, the parameter customization screen 136 is displayed by selecting the user or key. This screen shows the key parameters since the last key refresh operation. For security reasons, the software tracks which supervisor last authorized limit changes. By clicking on the two buttons "View Present Limits" and "View Previous Limits," the user can see when the last changes were made on the key and by which supervisor (step 142 of FIG. 9C). On this screen, the pointer will move the curser to the parameter the user wishes to change. The user then enters the desired value (step 144 of FIG. 9C). After typing in the change, another parameter may be selected and changed. When all parameters have been changed, the "Accept" button is selected to record the new parameters in the database (step 146 of FIG. 9C). At the time these are stored, the name of the supervisor operating the computer is also stored to archive the authorization in case a key is given limits beyond their approved level and an audit of who assigned these unauthorized limits is required.

A "Disable FOB" button 137 is provided in the screen 136 to disable the key at its next refresh. In this regard, if the key reaches any of the limits, it will become disabled. The key will indicate that it is disabled by flashing brightly three times when the key is in the cradle and the transmit button of the key is pressed.

After the new parameters have been stored, prior parameters for this key are also kept in the database for easy viewing. In addition, the time and date of the prior docking event and the parameters can be stored and easily viewed.

Figure 10:
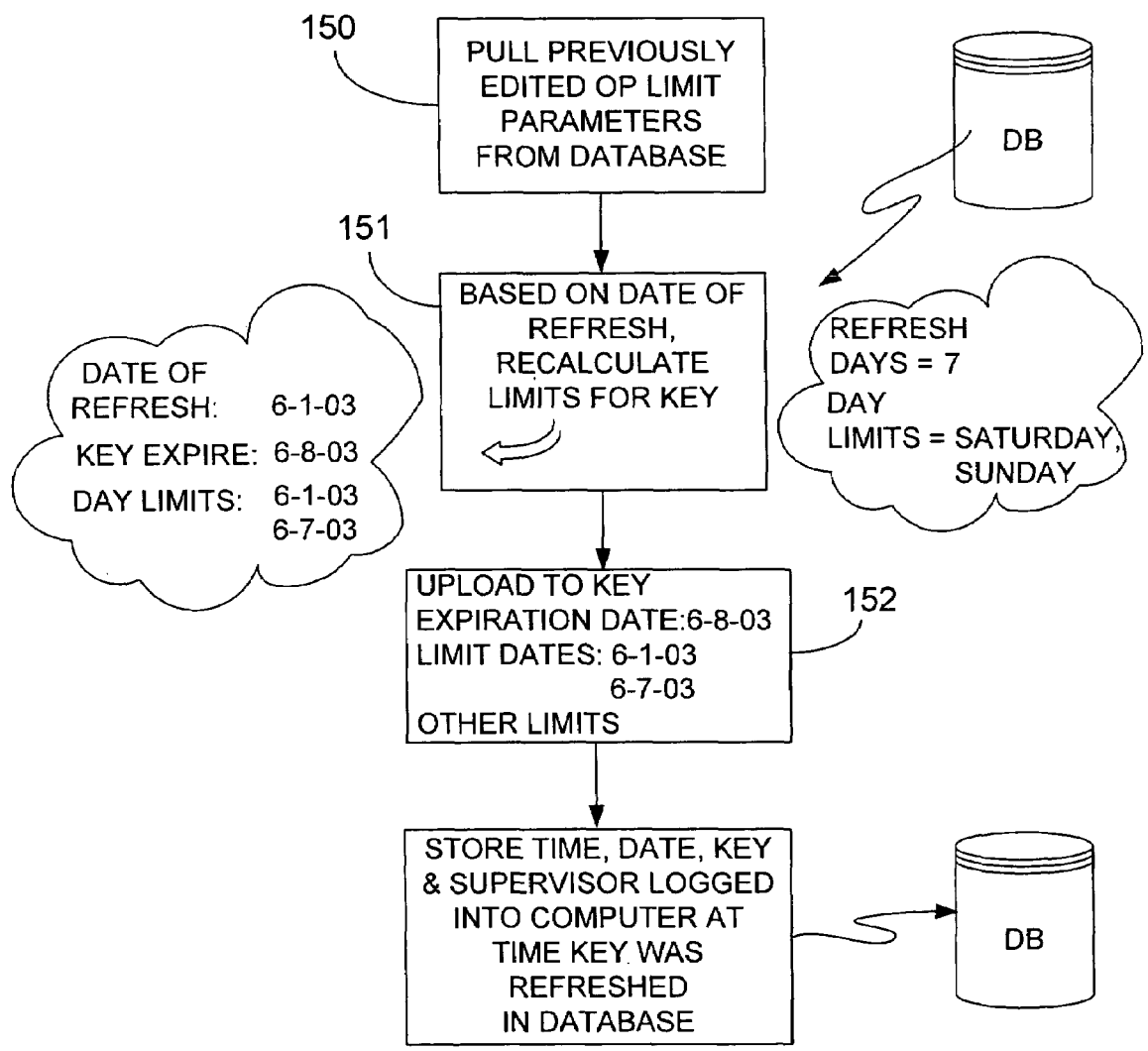
FIG. 10 is a flow chart showing a process of re-calculating key limit parameters during a key refresh operation.

Later, in a key refreshing operation, the button of the key is pressed on the key and the limit parameters are loaded into the memory of the key. FIG. 10 illustrates by way of example the process of re-calculating the limit parameters during the key refreshing operation. The program 34 takes the limits defined for the key from the database (step 150) and, at the time of refresh, using the existing date and time to calculate certain date specific limit parameters such as the date the key should expire and the days the key should operate (step 151). Last, these parameters are loaded into the key (step 152). This process allows the supervisor to maintain work schedules in the database for each employee and as long as the schedule does not change the expiration limits will be properly re-calculated at the time of each refresh. Thus, the supervisor does not need to maintain key parameters on a routine basis, as they are automatically calculated at each refresh based on the database information for each key.

In accordance with an aspect of the invention, it is advantageous to provide the capability of more than one docking station or cradle to service the same keys and vending machine locks. This is accomplished by providing a mechanism for either (1) multiple cradles communicating with multiple databases, wherein these databases would be synchronized and merged from time to time (FIG. 12); or (2) multiple cradles communicating with a single central database (FIGS. 13-15). The advantages and disadvantages of each configuration are described below.

Figure 12:
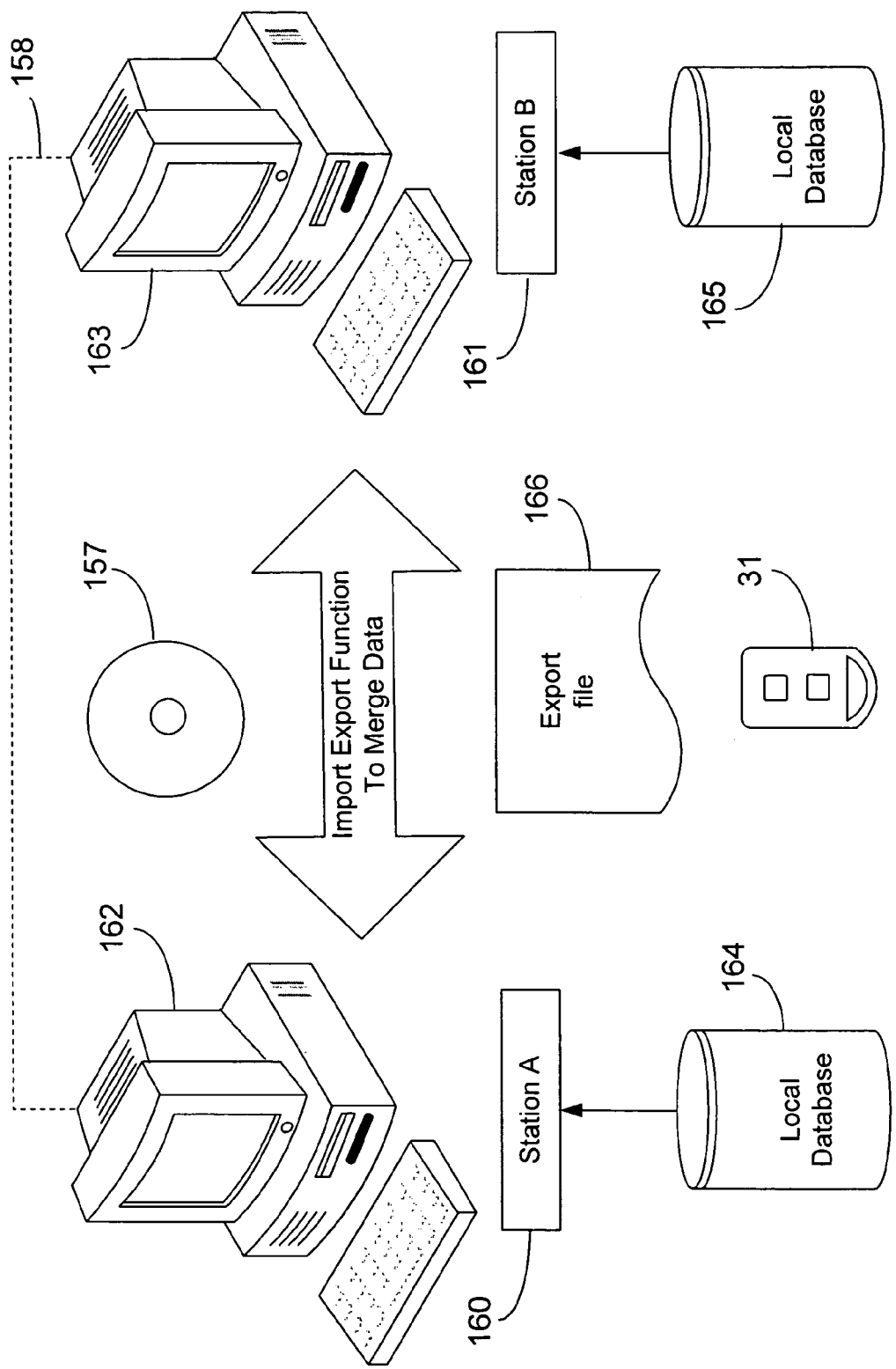
FIG. 12 is a schematic diagram showing a configuration of multiple key management databases that are synchronized using export files.
Figure 13:
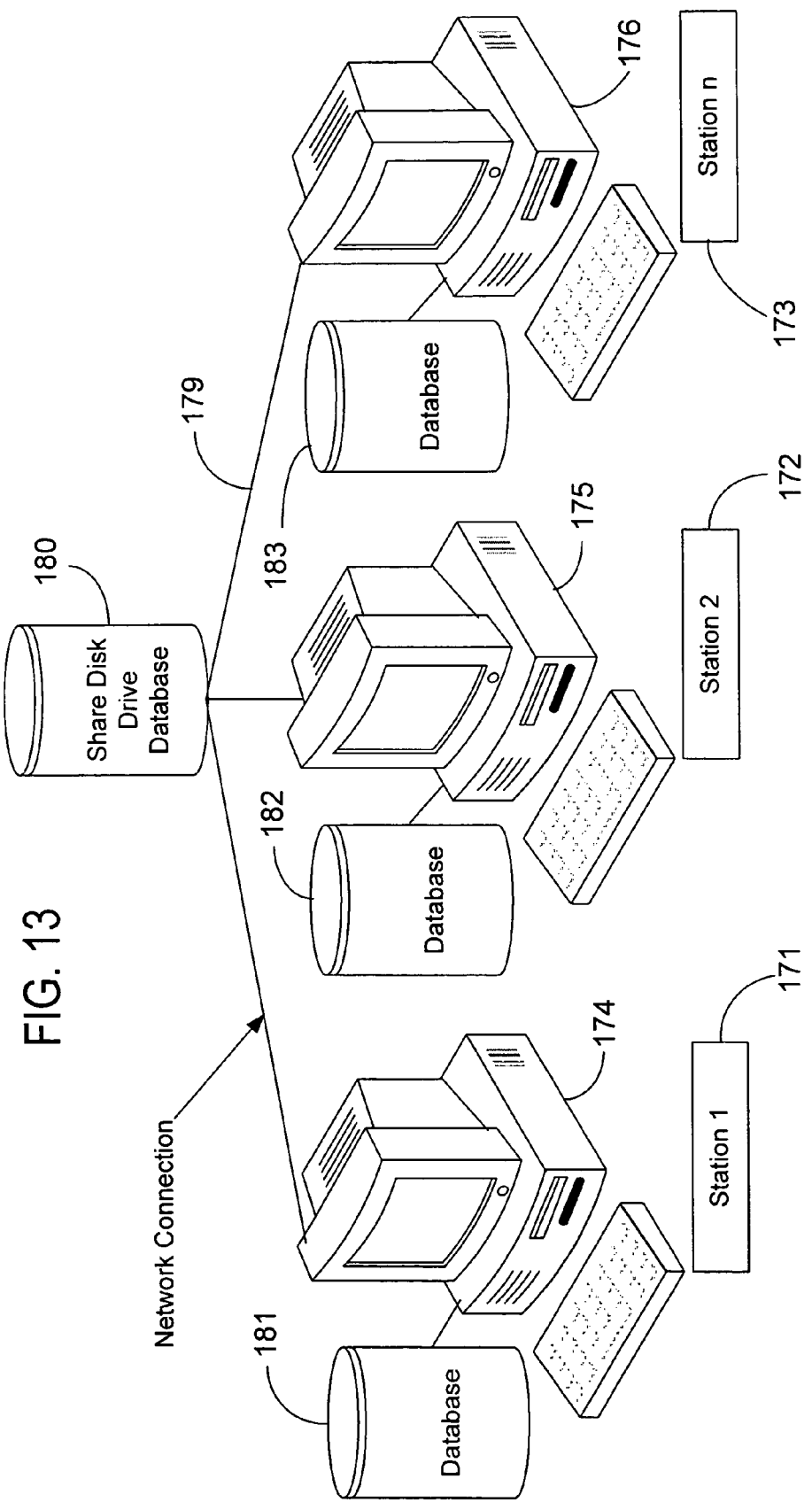
FIG. 13 is a schematic diagram showing a configuration with multiple key management stations connected via a network to a central key management database.

Multiple Cradles Communicating with Multiple Databases:

In one configuration illustrated in FIG. 12, multiple cradles are located at multiple separate locations, with each cradle interfaced to a PC containing separate databases. For simplicity of illustration, FIG. 12 shows only two cradles 160 and 161 attached to computers 162 and 163, respectively, but more cradles and computers at other locations may be included. In the illustrated embodiment, the database 164 is accessible to the computer 162, and the database 165 is accessible to the computer 163. The databases 164, 165 may be local to the computers 162, 163, respectively, or may be at remote locations and connected to the computers via network connections. It is possible to allow electronic keys to visit and be refreshed by more than one cradle/database. One way to accomplish this is to initialize each key into one cradle 160 or PC database 164. Once each key 31 is initialized, the databases 164 and 165 may be synchronized. Synchronization is accomplished by exchanging the key and vending machine lock data from one database 164 to another 165 and vice versa until all databases share the same key and vending machine lock data. This may be accomplished, for example, by creating an "export" file by the export utility from each database that contains the key and vending machine data of the database. The user interface screens 167 and 168 for this operation are shown in FIG. 16. In the screen 167, the user selects to export the database, and in the screen the user identifies the path to the database file. In the illustrate example, the export directory contains the file DBOut.mdb as the container of the export file. The export file may be stored on a transportable medium, such as a floppy disk, a CD ROM 157, a USB key, a memory card, etc. Alternatively, the export file may be transmitted to another computer via a network 158, preferably in an encrypted format to ensure the security of the transmission. This export file 166 is next presented to another computer database by using the import utility. This import utility will search for data in the export file that is not in the local database, and load this new data into the local database. If the data presented by the export file is a duplicate of data already existing in the database running the import utility, the data is not imported as a duplicate and is discarded. For example, if a vending machine lock serial number and location is in the export file 166 and presented to the database 164 by the import utility, but already exists in the database, it is not entered into the database. This import and export procedure should be executed on a regular basis and the key and vending machine data will stay consistent in each database.

Multiple Cradles Communicating with a Single Database:

In an embodiment of this configuration shown in FIG. 13, multiple cradles 171, 172, 173 are located at multiple remote locations, each interfaced to a separate PC 174, 175, or 176 that has access to a shared database 180 via a network connection such as a local-area network (LAN) 179. Since there is only one database, there is no need for synchronization. In this embodiment, each cradle and PC has access to send/receive data to/from the network-centralized database 180. There are several issues about giving access to the central database 180 to more than one computer. One such issue is if two computers attempt to access the database at the same time, data could be lost or over-written. Another concern is the time it takes to access and communicate with the database. For example, if a significant amount of data must be downloaded from a key at one station, this download process could take several minutes to finish. If another key is also trying to download data and receive new access limits from another computer and cradle, the waiting time could be significant.

Thus, it is a feature of the embodiment to provide multiple cradles with access to the same database and provide a fast refresh time so employees are not delayed waiting for their keys to be refreshed. One mechanism to accomplish this is for each computer 174, 175, 176 to hold a refresh buffer 181, 182, or 183 locally in its PC in order to allow for fast refreshes during busy working hours, and during non-work hours when network traffic is minimized the PC will upload it's data in the database 180 on the network. Also in this example the local PC may use the refresh buffer as a local database, or use a separate database, for holding the key limit data. This allows fast refresh of key limits, and would store the audit trail data in the buffer. A copy of the shared database is downloaded from the shared drive by each station and stored locally. In the case the connection to the shared database 180 is interrupted, each individual station can continue servicing keys without interruption using the local database. In this mode, typically no changes or additions are allowed to the database such as key limits and vending machine information.

Figure 17:
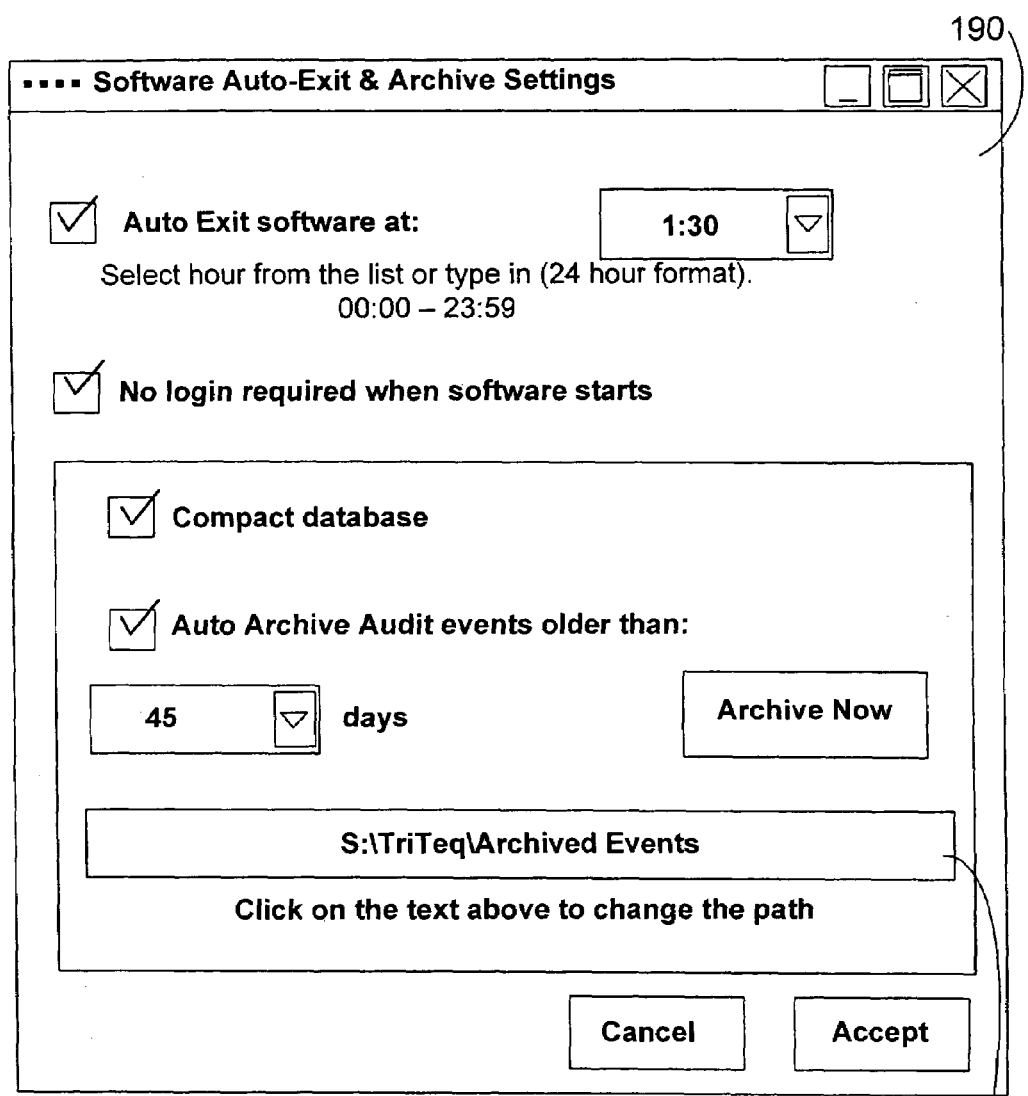
FIG. 17 shows a user interface screen for setting software auto-exit and archive settings.

Database Compacting and Archive:

Compacting and Archiving of the database are tasks that need to be executed at a frequency dependent on the amount of data that is being added to the database. The more data that is added, the more frequent these task should be executed. In one embodiment, the system allows the user to select an automatic compacting and archiving of the audit trail data. Also allowed is selecting automatic exiting of the software and automatic login of the software at selected intervals. FIG. 17 shows a user interface screen 190 for a user to select the parameters. In this example, the user selects the system will automatically compact and archive each 45 days. Also selected is the path & location of the archive 192. In addition, the system is capable of monitoring the amount of data entering the database and executing an automatic compaction and archive if a certain volume of data is moved into the database.

System Start/Exit

Figure 19:
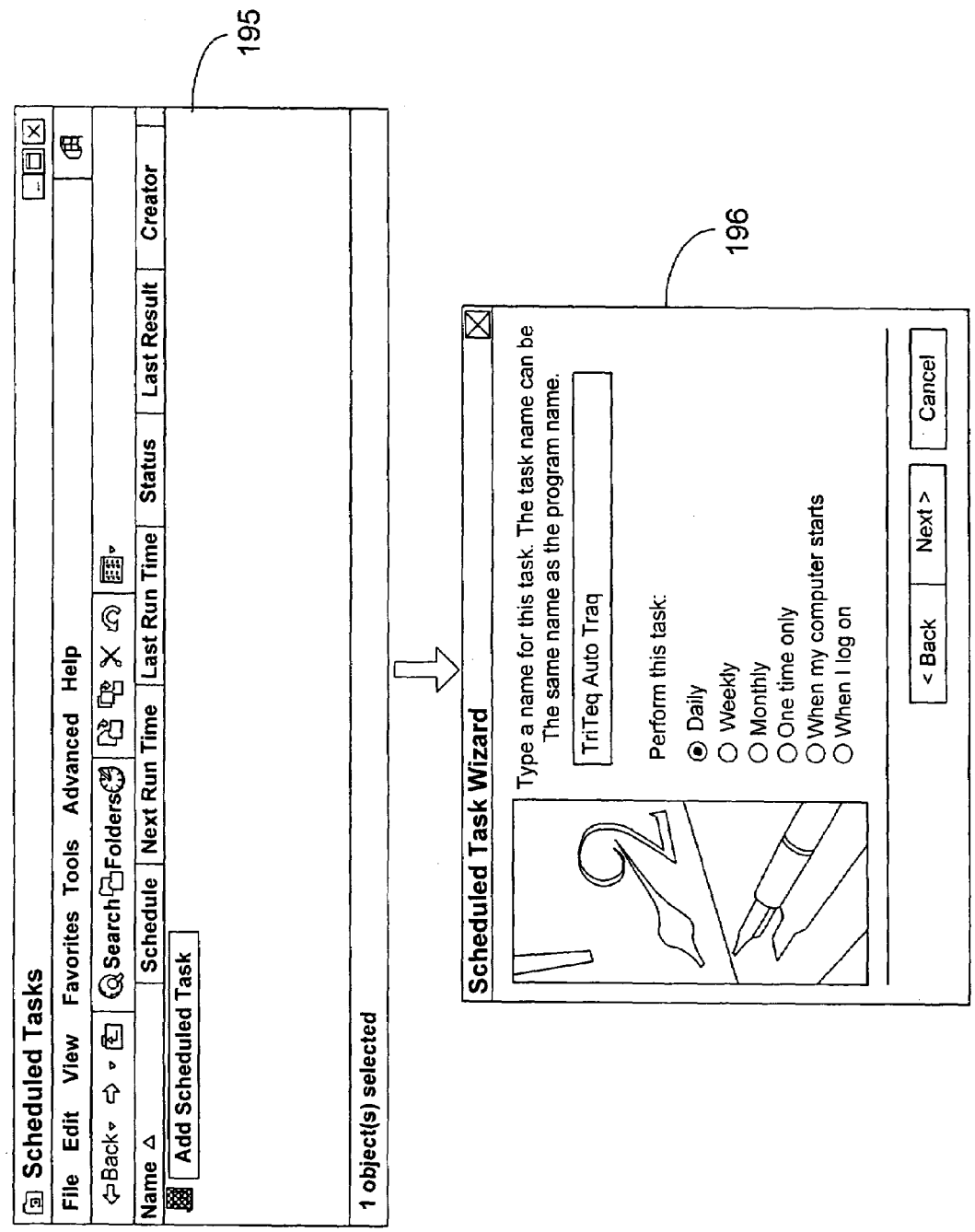
Figure 21:
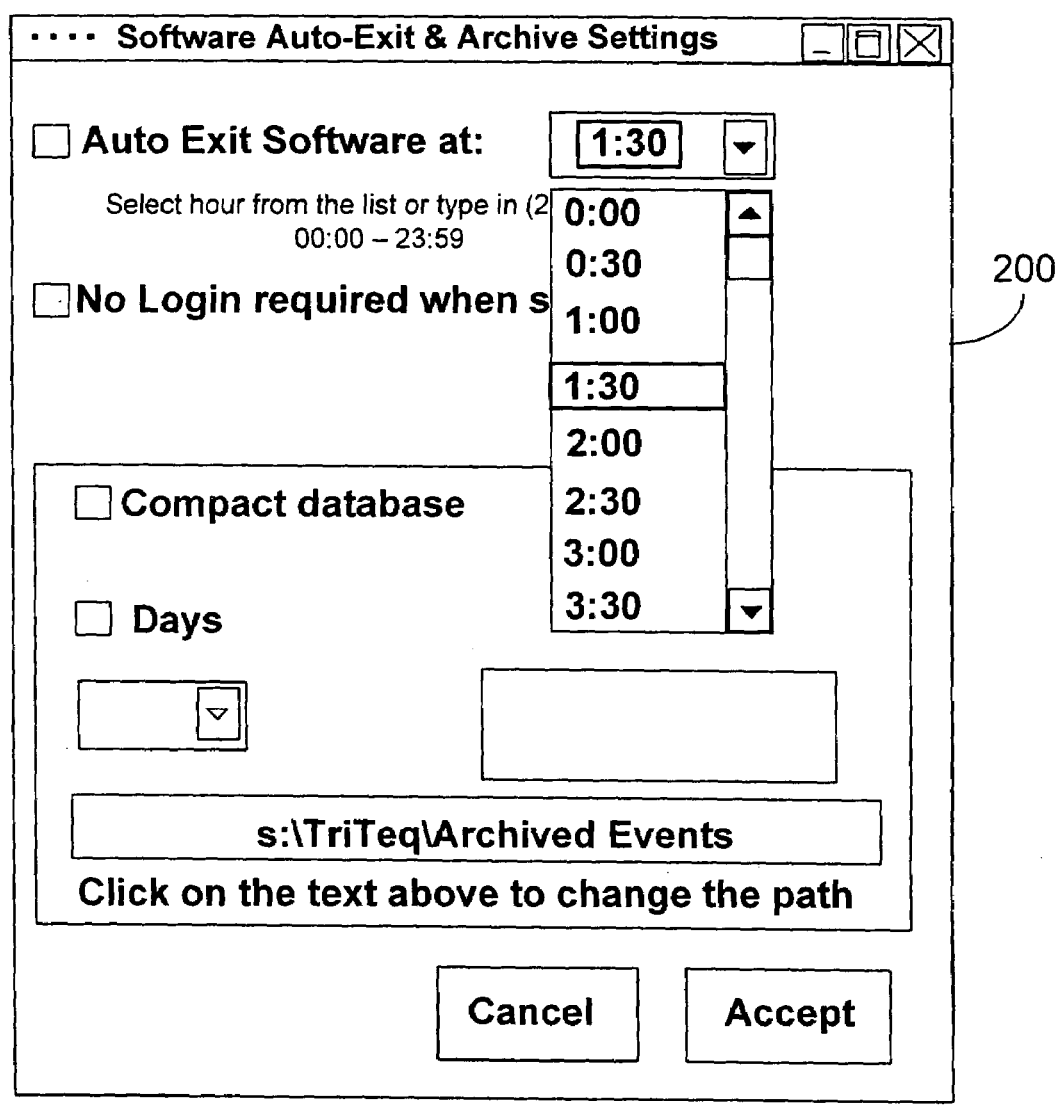
FIGS. 21 and 22 show user interface screens involved in setting the auto-exit time for the key management system.
Figure 22:
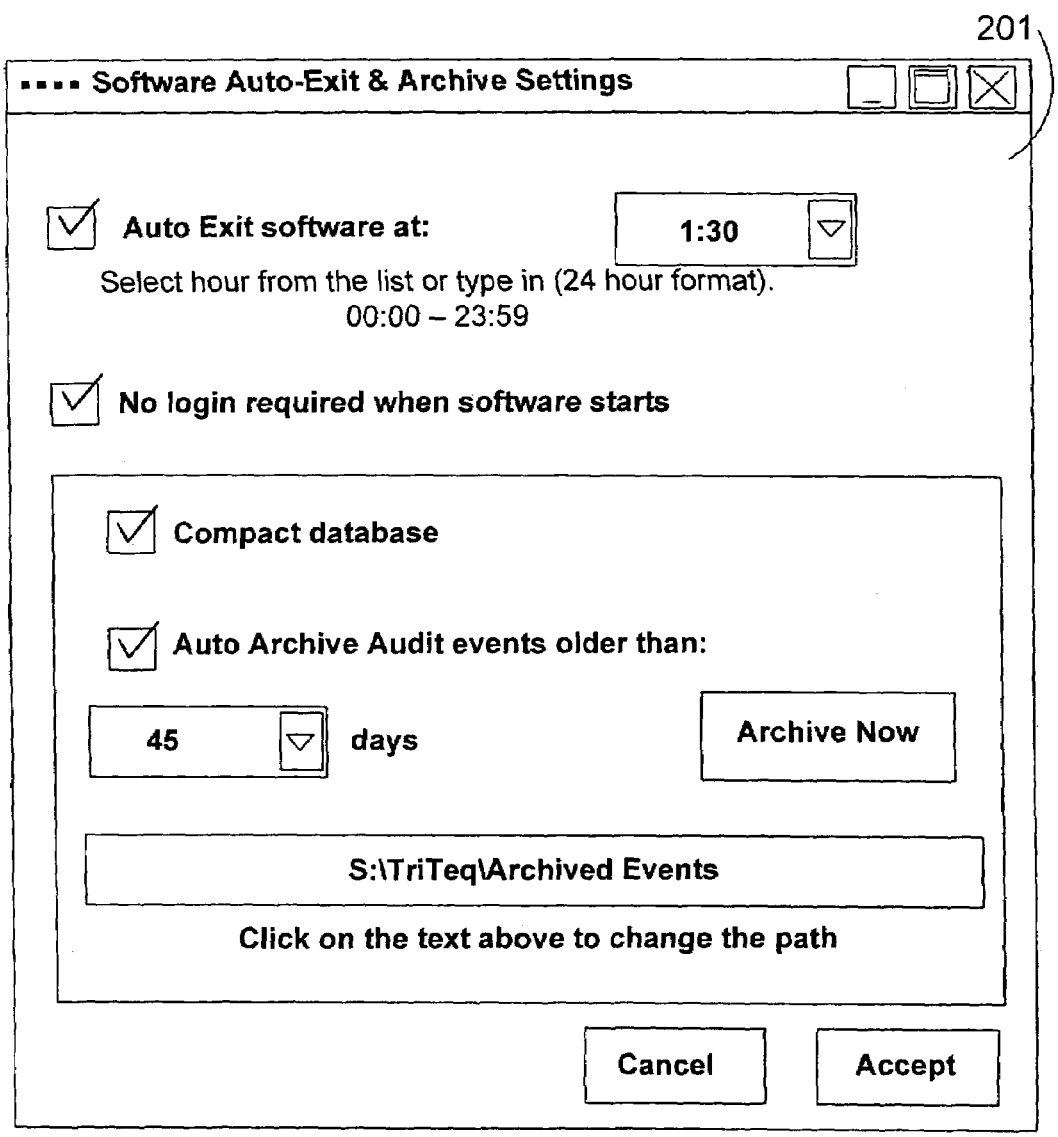

The system is capable of automatically starting up and exiting from operation on a daily basis. The start and stop times can be pre-determined and entered into the system as a scheduled task. FIGS. 18-20 show a sequence of user interface screens 193, 194, 195, 196, 197, 198 to illustrate an example of how the system is scheduled to start-up at 4:00 AM every day. FIGS. 21-22 contains user interface screens 200, 201 that illustrate an example of how the user selects the system to automatically exit from operation at 1:30 AM each day.

Figure 14A:
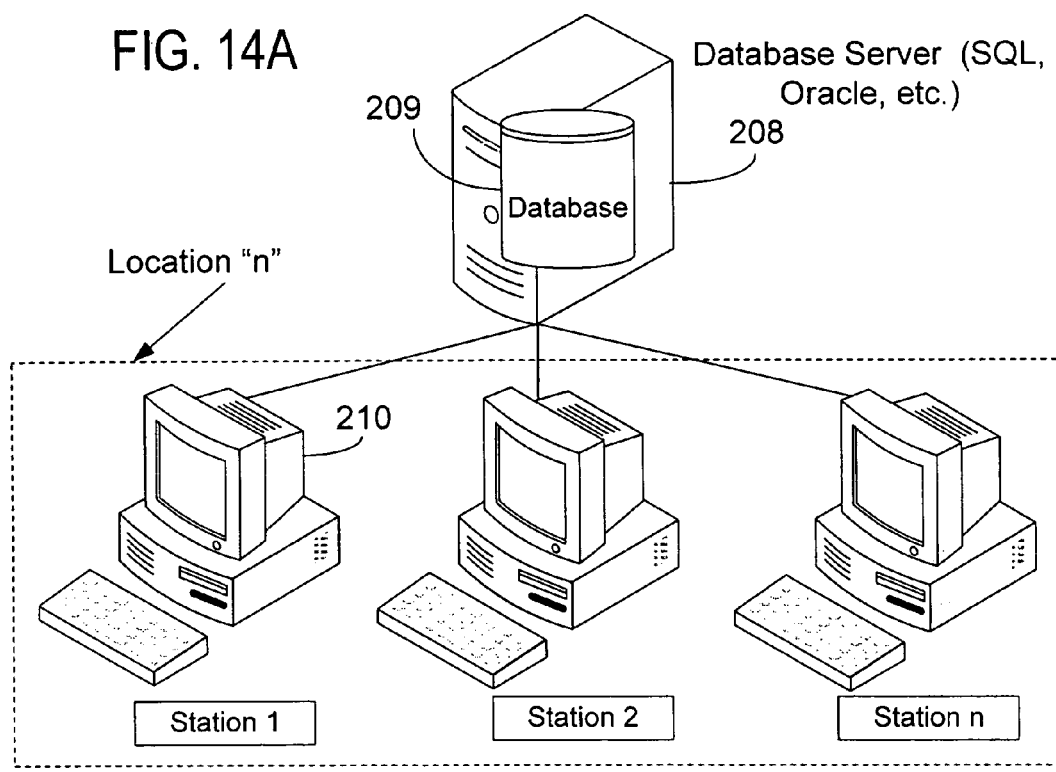
FIG. 14A is a schematic diagram showing a configuration of multiple key management stations connected to a central database with a database server.
Figure 15:
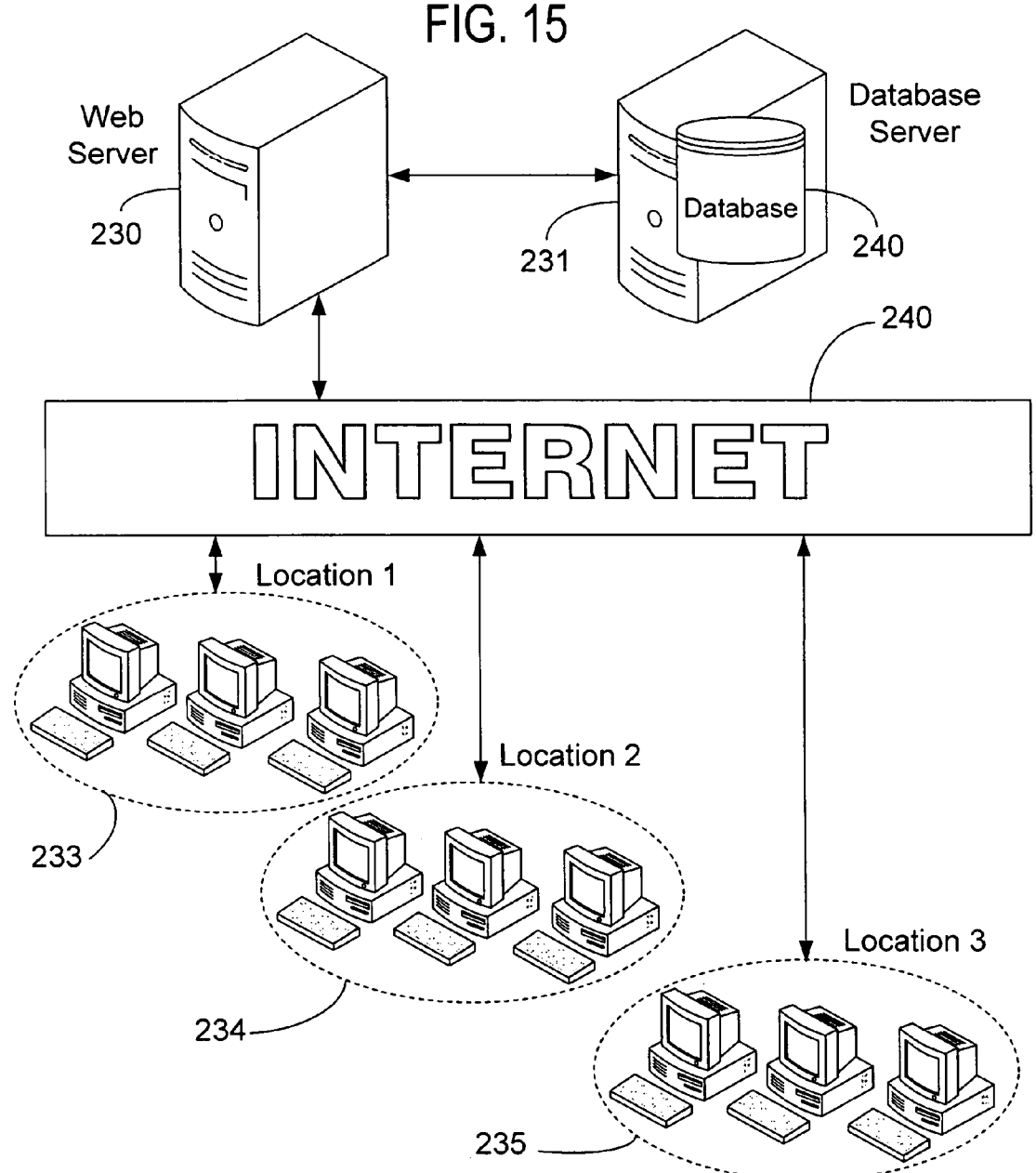
FIG. 15 is a schematic diagram showing a configuration with key management stations at different locations connected to a central database server through the Internet.

In an alternative embodiment illustrated in FIG. 14A referred to as the pre-enterprise configuration, the single database configuration uses a dedicated database server 208. This configuration contains all of the above-described features from the LAN network single database embodiment, while each station is allowed to access a dedicated database server 208 (SQL, Oracle, etc). A local station 210 connecting to the database 209 will be accomplished using the standard "Data Source (ODBC)" included in all Windows operating systems. After connection to database is accomplished, the user uses the key control operation features the same as in the previous configuration. Potential advantages of this configuration are increase database reliability, faster response time on accessing, changing, or adding records to the database, and significantly less data traffic.

Figure 14B:
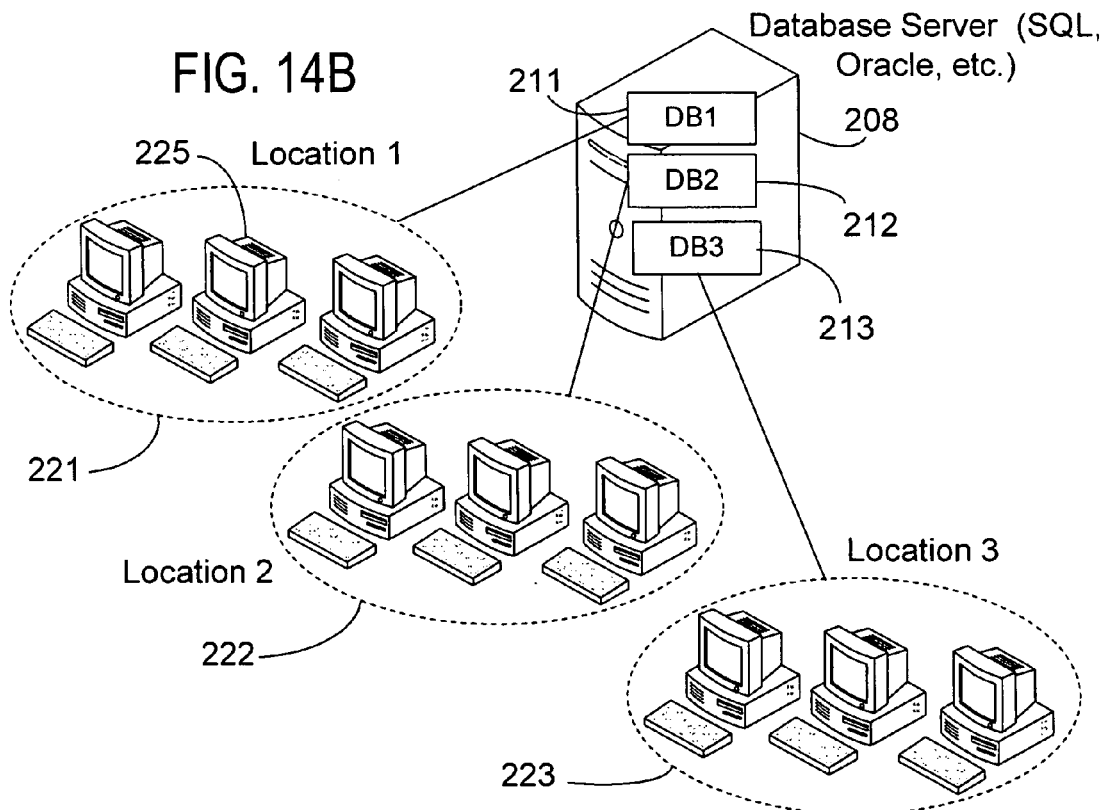
FIG. 14B is a schematic diagram showing a configuration of key management stations at multiple remote separate locations connected to a central database server with multiple databases for the separate locations.

Referring to FIG. 14B, the added capacity of a dedicated database server 208 can be used by mounting multiple databases 211, 212, 213 for serving multiple locations 221, 222, 223, respectively. In such instances the databases 211, 212, 213 can be identified by the specific city code, or group of city codes each database represents. A location can be, for instance, a cluster of bottling stations and/or a bottling station and several satellite locations. Stations from each location are assigned rights to access only the database they are associated with. For instance, computers at the location 221 may access only the database 211, and computers at the location 222 may access only the database 212. This configuration adds the benefit of creating global access reports that will include reports from all locations. Another benefit of this configuration is the option of remote control and administration of database from a remote location. For example, if appropriate rights are assigned to Station 225 at Location 221, this station can manage keys, users and vending machines at location 221 as well as the other locations. By using a LAN type network, the security of this configuration should adequately prevent hackers from gaining access to the database and the security of the system.

In another alternative embodiment of the single database configuration illustrated in FIG. 15, a web server 230 connected to a database server 231 is used. This configuration is referred to as the Enterprise configuration. Each of the individual stations uses a simple web browser (e.g., Internet Explorer, Netscape, Opera, etc.) to communicate with the web server 230 to access the database or databases 240 maintained by the database server 231. In this way, the individual stations can accomplish functions related to key refresh, adding keys and users, adding vending machines and asset numbers, and modify key settings as in the previously described configurations. In the event of lost Internet connection, the stations in this configuration operate a simplified version of the software as described in FIGS. 13 & 14 for refreshing keys while the connection with the web server 230 is severed. One benefit of this configuration is the ability to use the Internet infrastructure to create a wide-area network for remotely operating the stations and thus eliminate the need to support a separate or dedicated structure to accomplish the same. Another benefit of this configuration is that software updates for the functionality of the stations as well as adding and deleting stations will be done in the web server and may not require user intervention at the station when these tasks are performed. One potential disadvantage is that hackers may attempt to get access to the database since the network is accessible to almost anyone with a browser and access to the web.

In another embodiment of this invention, an enhanced electronic key has additional hardware and software features to enhance the security, tracking, audit data control, and assisting of the employee to fill and service the vending machine. FIG. 23 is a functional block diagram of the enhanced electronic key 300. The key 300 has a microprocessor or microcomputer 301, a non-volatile memory 302, a real-time clock 307, and a battery 312 for powering the components of the key. The memory 302 may contain software and data required for the operation of the key, such as key codes, an encryption code for use in encrypting and decrypting communications with an electronic lock, encryption/decryption algorithms, backup clock data, power-up counter. The key memory may also contain data collected form vending machines, such as access audit data and vending machine inventory data.

The key 300 includes a two-way communication module 303 with a transceiver 310 for two-way communications with the electronic lock 299 of a vending machine. The key may also include user interface features 304 such as a keypad, touch screen, or buttons with specific functions. An annunciation component 305, such as LCD screen, may be included for displaying key-lock responses, text messaging, email, etc. The key may include another two-way communication component 306 that has a transceiver 311 for communicating wirelessly with a home-base 298.

As a feature of the embodiment, the electronic key 300 may further include a position sensing component 308 for identifying the current location of the key. This component, which may include an antenna 309 and may be internal or external to the key, may be based on one of the positioning systems such as GPS, DGPS, LORAN, etc.

The advantage of including the position sensing system component 308 in the key is that ability to track the location of each key used to access the vending machines. For example, electronic keys that include location tracking would pinpoint the geographical location of each vending machine the user of the key was attempting to access. Thus, and audit event for an access attempt would consist of the user of the key, the key code, the date and time of the attempt, the limits (if any) of the key, the serial or ID number of the vending machine, and the physical location (preferably at least 2-dimensional latitude and longitudinal coordinates, and possibly the third dimensional or altitude coordinate) of the vending machine being accessed. These coordinates could be translated by computer to common street address and location (for example, 100 W. Plainfield Rd, Countryside, Ill., second floor, suite 202).

When an electronic key has the capability of obtaining the location coordinates of a vending machine (either by receiving these coordinates itself by a position sensing system or by communication with a position sensing system at the vending machine location), the previously described step of reading the serial number of the vending machine (with a reader tool, or a bar code reading device, or by the electronic key) and entering the vending machine location data into the computer 32 manually may be eliminated. Since the electronic key will produce or receive the location coordinates at the time it attempts to access the vending machine, this data can be provided to the database as the vending machine location in lieu of a manual entry, which is subject to human error.

An additional benefit of the position sensing feature in the electronic key 300 is the ability to keep track of and/or locate keys if they are lost or stolen. Since this key has the data exchange feature described above, it can transmit its location coordinates to the central or home-base location or to a person possessing a computing device that would receive the location information.

An additional feature of this key 300 is the data transfer capability. In additional to its capability of transferring data in short range to the docking cradle (as described for other keys in this system) this key may be equipped with the capability to transmit and receive data over longer distances. Thus, as a key is being operated the audit data and the vending machine sales and inventory data would be transferred back to a central or home-base location. The enhanced communication capabilities would include text messaging and email in order for the person using the key to send and receive information concerning the route they are working on, changes and additions, reports, etc.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A key management system for management of electronic keys used to access electronic locks of vending machines, comprising a computer having a software program for key management functionality; a database containing key management data; and a cradle communicating with the computer for interfacing the computer with an electronic key; the software program having computer-executable instructions for performing an automatic key refreshing operation; receiving a the steps of receiving an initial transmission from a key through the cradle, the initial transmission initiating the automatic key refreshing operation; receiving a key identification number from the key through the cradle; retrieving from the database information of a user of the key and operation limit parameters for said user based on the key identification number; and sending the operation limit parameters through the cradle to the key for writing into a memory of the key, wherein the key contains audit trails data collected from vending machines accessed using said key, and wherein the software program has further computer-executable instructions for receiving the audit trails data from the key, and storing the received audit trails data into the database.

2. A key management system as in claim 1, wherein the cradle communicates with the key though wireless transmissions.

3. A key management system as in claim 2, wherein the cradle is connected to a communication port of the computer.

4. A key management system as in claim 1, wherein the software program includes computer-executable instructions for comparing the audit trails data received from the key with data stored in the database to determine whether the received audit trails data contains duplicate data that is duplicate to the data stored in the database, and removing the duplicate data before storing the received audit trails data into the database.

5. A key management system as in claim 1, wherein the software program has further computer-executable instructions for identifying from the received audit trails data a lock identification for an electronic lock not stored an the database, and presenting a user interface screen for prompting a user to enter data regarding the electronic lock.

6. A key management system as an claim 1, wherein the cradle initiates an encrypted challenge-response communication with the key upon receiving the initial transmission from the key.

7. A key management system as in claim 1, wherein the software program includes computer-executable instructions for presenting a user interface screen for prompting an authorized user to set operation limit parameters for an electronic key, and saving the operation limit parameters for the electronic key into the database.

8. A key management system as in claim 7, wherein the software program includes computer-executable instructions for presenting a user interface screen for a system administrator to add or delete a user having authority for setting operation limit parameters for electronic keys.

9. A key management system as in claim 1, wherein the database is at a location remote from the computer and accessible by the software program via a network.

10. A key management system as in claim 9, wherein the network is the Internet.

11. A key management system as in claim 9, wherein the computer includes a local data buffer for storing key management data downloaded from the database.

12. A key management system as in claim 1, where the software program includes computer-executable instructions for selecting and displaying operation limit parameters for a plurality of electronic keys.

13. A key management system for management of electronic keys used to access vending machines, comprising a plurality of key management stations including at least first and second key management stations, each key management station having a computer with a software program for key management functionality and a cradle communicating with the computer for interfacing the computer with an electronic key and for receiving an initial transmission from the key for initiating an automatic key refreshing operation, the first key management station having access to a first database containing key management data, and the second key management station having access to a second database containing key management data, the software program on the computer of the first key management station having computer-executable instructions for receiving operation limit parameters designated to a key identification number, storing the operation limit parameters with the key identification number into the first database, and generating an electronic data structure containing the key identification number and the operation limit parameters for said key for delivery to the second key management station for synchronizing the second database with the first database, and wherein the key contains audit trails data collected from vending machines accessed using said key, and wherein the software program has further computer-executable instructions for receiving the audit trails data from the key, and storing the received audit trails data into the database.

14. A key management system as in claim 13, wherein the software program of the first key management station has computer-executable instructions for presenting a user interface screen for prompting a user to manually enter the operation limit parameters for the key.

15. A key management system as in claim 13, wherein the electronic data structure is stored on a transportable medium for delivery to the second key management station.

16. A key management system as in claim 14, wherein the electronic data structure is transmitted to the second key management station via a network.

17. A key management system as in claim 13, wherein the software program of the first key management station further includes computer-executable instructions for receiving a second electronic data structure containing key management data, and importing the key management data in the second electronic data structure into the first database.

18. A key management system for management of electronic keys used to access vending machines, comprising a plurality of key management stations including at least first and second key management stations, each key management station having a computer with a software program for key management functionality and a cradle communicating with the computer for interfacing the computer with an electronic key, and for receiving an initial transmission and a key identification number from a key through the cradle, the initial transmission initiating an automatic key refreshing operation, the first and second key management stations both having access to a shared database containing the key management data, the first key management station having a first database address pointer and the second key management station having a second database address pointer that is the same as the first database address pointer, the software program on the computer of either key management station having computer-executable instructions for receiving operation limit parameters designated to a key identification number, storing the operation limit parameters with the key identification number into the shared database, wherein the key contains audit trails data collected from vending machines accessed using said key, and wherein the software program has further computer-executable instructions for receiving the audit trails data from the key, and storing the received audit trails data into the database.

19. A key management system as in claim 18, wherein the cradle communicates with the key through wireless transmissions.

20. A key management system as in claim 19, wherein the cradle is connected to a communication port of the computer.

21. A key management system as in claim 18, wherein the key contains audit trails data collected from vending machines accessed using said key, and wherein the software program has further computer-executable instructions for receiving the audit trails data from the key, and storing the received audit trails data into the database.

22. A key management system as in claim 21, wherein the software program includes computer-executable instructions for comparing the audit trails data received from the key with data stored in the database to determine whether the received audit trails data contains duplicate data that is duplicate to the data stored in the database, and removing the duplicate data before storing the received audit trails data into the database.

23. A key management system as in claim 21, wherein the software program has further computer-executable instructions for identifying from the received audit trails data a lock identification for an electronic lock not stored in the database, and presenting a user interface screen for prompting a user to enter data regarding the electronic lock.

24. A key management system as in claim 18, wherein the cradle initiates an encrypted challenge-response communication with the key upon receiving the initial transmission from the key.

25. A key management system as in claim 18, wherein the software program includes computer-executable instructions for presenting a user interface screen for prompting an authorized user to set operation limit parameters for an electronic key, and saving the operation limit parameters for the electronic key into the database.

26. A key management system as in claim 25, wherein the software program includes computer-executable instructions for presenting a user interface screen for a system administrator to add or delete a user having authority for setting operation limit parameters for electronic keys.

27. A key management system as in claim 18, wherein the database is at a location remote from the computer and accessible by the software program via a network.

28. A key management system as in claim 27, wherein the network is the Internet.

29. A key management system as in claim 27, wherein the computer includes a local data buffer for storing key management data downloaded from the database.

30. A key management system as in claim 18, where the software program includes computer-executable instructions for selecting and displaying operation limit parameters for a plurality of electronic keys.

* * * * *